US011109426B2

(12) United States Patent
Aoki

(10) Patent No.: US 11,109,426 B2
(45) Date of Patent: Aug. 31, 2021

(54) COMMUNICATION APPARATUS, COMMUNICATION METHOD, AND PROGRAM

(71) Applicant: CANON KABUSHIKI KAISHA, Tokyo (JP)

(72) Inventor: Hitoshi Aoki, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/319,228

(22) PCT Filed: Jul. 11, 2017

(86) PCT No.: PCT/JP2017/025242
§ 371 (c)(1),
(2) Date: Jan. 18, 2019

(87) PCT Pub. No.: WO2018/016379
PCT Pub. Date: Jan. 25, 2018

(65) Prior Publication Data
US 2019/0289644 A1  Sep. 19, 2019

(30) Foreign Application Priority Data

Jul. 21, 2016  (JP) .............................. JP2016-143734

(51) Int. Cl.
*H04W 76/10* (2018.01)
*H04W 8/00* (2009.01)
(Continued)

(52) U.S. Cl.
CPC ........... *H04W 76/10* (2018.02); *H04W 8/005* (2013.01); *H04W 48/20* (2013.01); *H04W 84/12* (2013.01); *H04W 84/18* (2013.01); *Y02D 30/70* (2020.08)

(58) Field of Classification Search
CPC ..................................................... H04W 76/10
See application file for complete search history.

(56) References Cited

U.S. PATENT DOCUMENTS 9,544,754 B1 *  1/2017  Lambert ............... H04W 8/005
10,321,494 B2 *  6/2019  Chen ...................... H04L 67/16
(Continued)

FOREIGN PATENT DOCUMENTS

JP  2017-517972 A  6/2017
WO  2015/184385 A1  12/2015
(Continued)

OTHER PUBLICATIONS

Camps-Mur, D., et al, "Enabling Always on Service Discovery: WiFi Neighbor Awareness Networking", IEEE Wireless Communications, Apr. 2015, pp. 118-125.
(Continued)

*Primary Examiner* — Jae Y Lee
*Assistant Examiner* — Andrew C Lee
(74) *Attorney, Agent, or Firm* — Canon U.S.A., Inc. IP Division

(57) ABSTRACT

A communication for executing a service with another communication apparatus that can execute a desired service is efficiently executed. A communication apparatus performs a communication for establishing a data link during a cyclic first period in a network, performs, in accordance with the data link established with another communication apparatus within the network, a communication based on the data link with the other communication apparatus by using the established data link during a second period other than the first period, and announces the second period within the network.

8 Claims, 12 Drawing Sheets

(51) Int. Cl.
  *H04W 48/20* (2009.01)
  *H04W 84/12* (2009.01)
  *H04W 84/18* (2009.01)

(56) References Cited

U.S. PATENT DOCUMENTS

| | | | | |
|---|---|---|---|---|
| 2007/0066273 | A1* | 3/2007 | Laroia | H04W 52/0235 455/343.2 |
| 2007/0165728 | A1* | 7/2007 | Parizhsky | H04L 27/2655 375/260 |
| 2010/0165882 | A1* | 7/2010 | Palanki | H04W 8/005 370/254 |
| 2013/0114580 | A1* | 5/2013 | Saitou | H04W 56/00 370/336 |
| 2013/0159401 | A1* | 6/2013 | Sukeno | G09G 5/008 709/203 |
| 2014/0198725 | A1* | 7/2014 | Abraham | H04W 76/00 370/328 |
| 2014/0254569 | A1* | 9/2014 | Abraham | H04L 5/0092 370/336 |
| 2014/0293992 | A1* | 10/2014 | Abraham | H04W 56/0035 370/350 |
| 2014/0302787 | A1 | 10/2014 | Rantala | |
| 2014/0313966 | A1* | 10/2014 | Shukla | H04W 48/10 370/312 |
| 2014/0321317 | A1* | 10/2014 | Kasslin | H04W 4/08 370/254 |
| 2015/0117375 | A1* | 4/2015 | Sartori | H04W 56/002 370/329 |
| 2015/0156709 | A1* | 6/2015 | Shukla | H04W 48/16 370/338 |
| 2015/0172901 | A1* | 6/2015 | Kasslin | H04W 8/005 370/328 |
| 2015/0341811 | A1* | 11/2015 | Deshpande | H04W 24/08 370/252 |
| 2015/0350866 | A1* | 12/2015 | Patil | H04W 40/244 370/254 |
| 2016/0014693 | A1* | 1/2016 | Patil | H04W 52/0216 370/254 |
| 2016/0128113 | A1 | 5/2016 | Qi | |
| 2016/0205529 | A1 | 7/2016 | Oren | |
| 2017/0034769 | A1* | 2/2017 | Kim | H04W 48/10 |

FOREIGN PATENT DOCUMENTS

| | | |
|---|---|---|
| WO | 2016/007782 A1 | 1/2016 |
| WO | 2016/049196 A1 | 3/2016 |
| WO | 2016/094446 A1 | 6/2016 |

OTHER PUBLICATIONS

WiFi Alliance, Neighbor Awareness Networking Technical Specification, Version 1.0, 2015.

* cited by examiner

[Fig. 1]
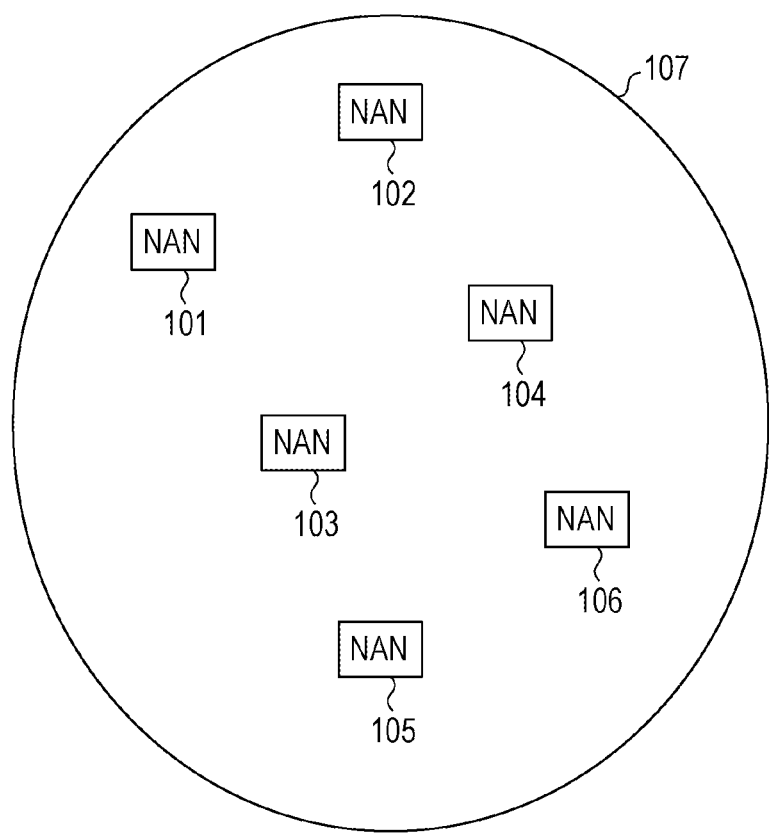

[Fig. 2]
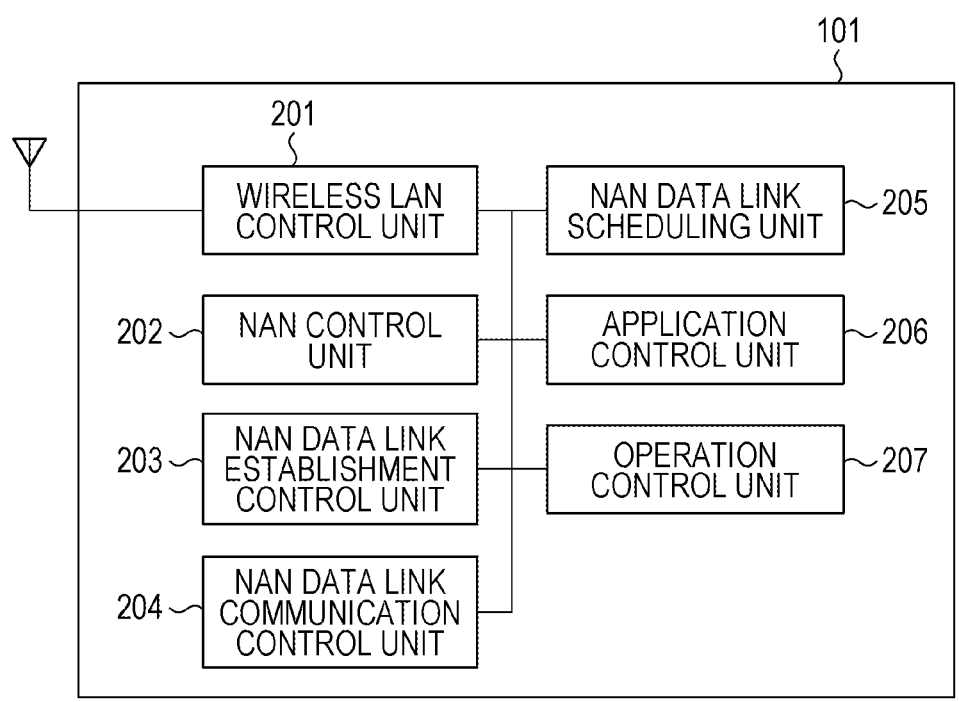

[Fig. 3]
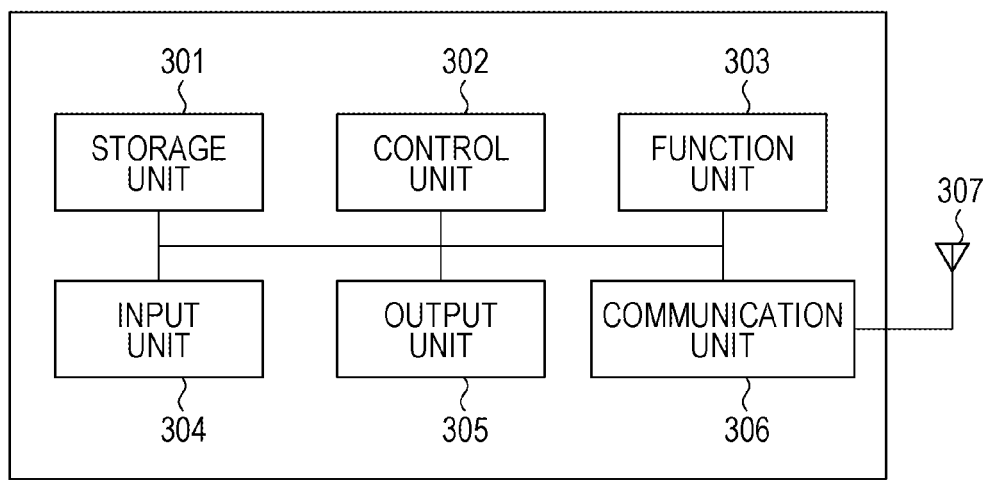

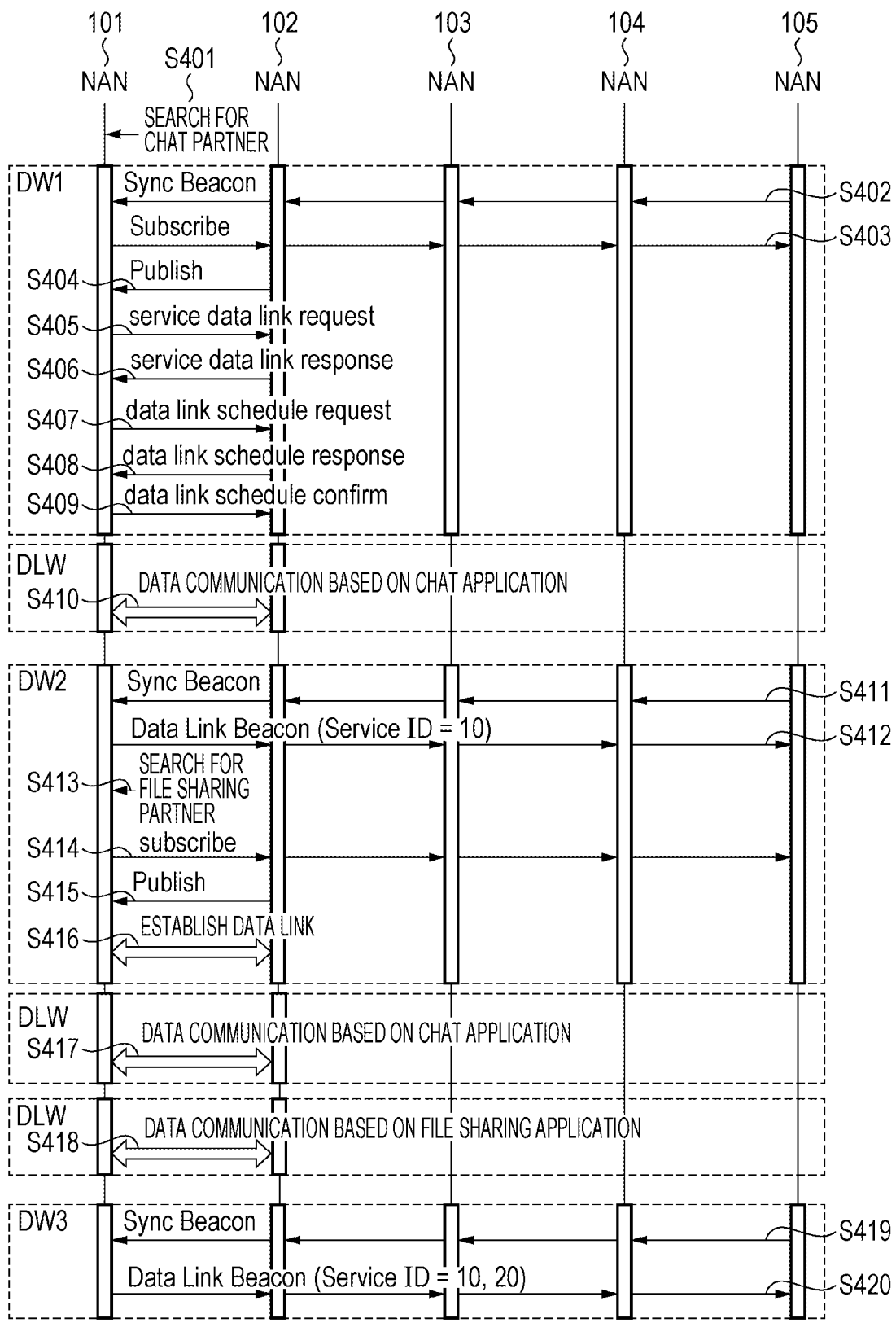
[Fig. 4]

[Fig. 5]
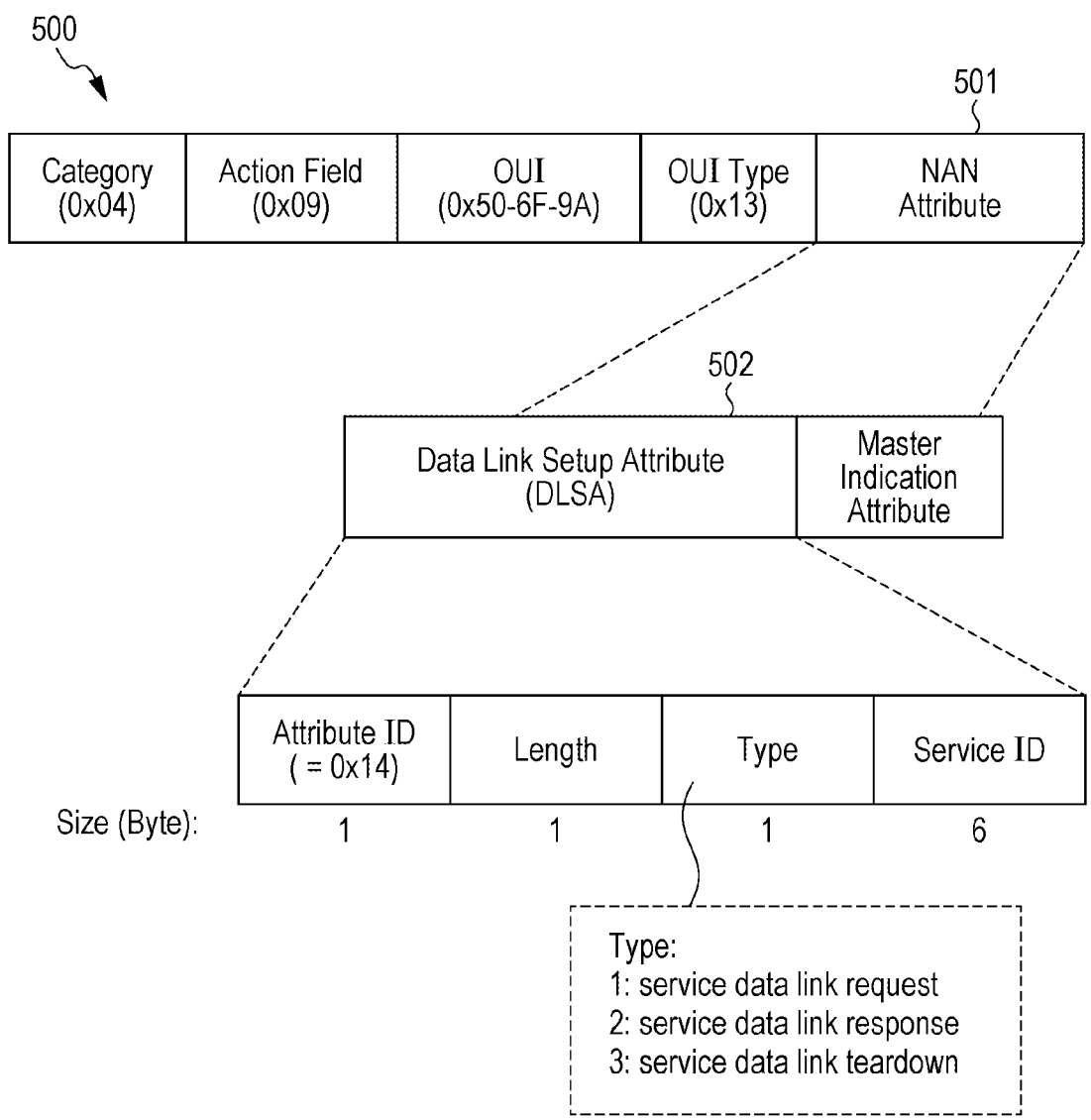

[Fig. 6]
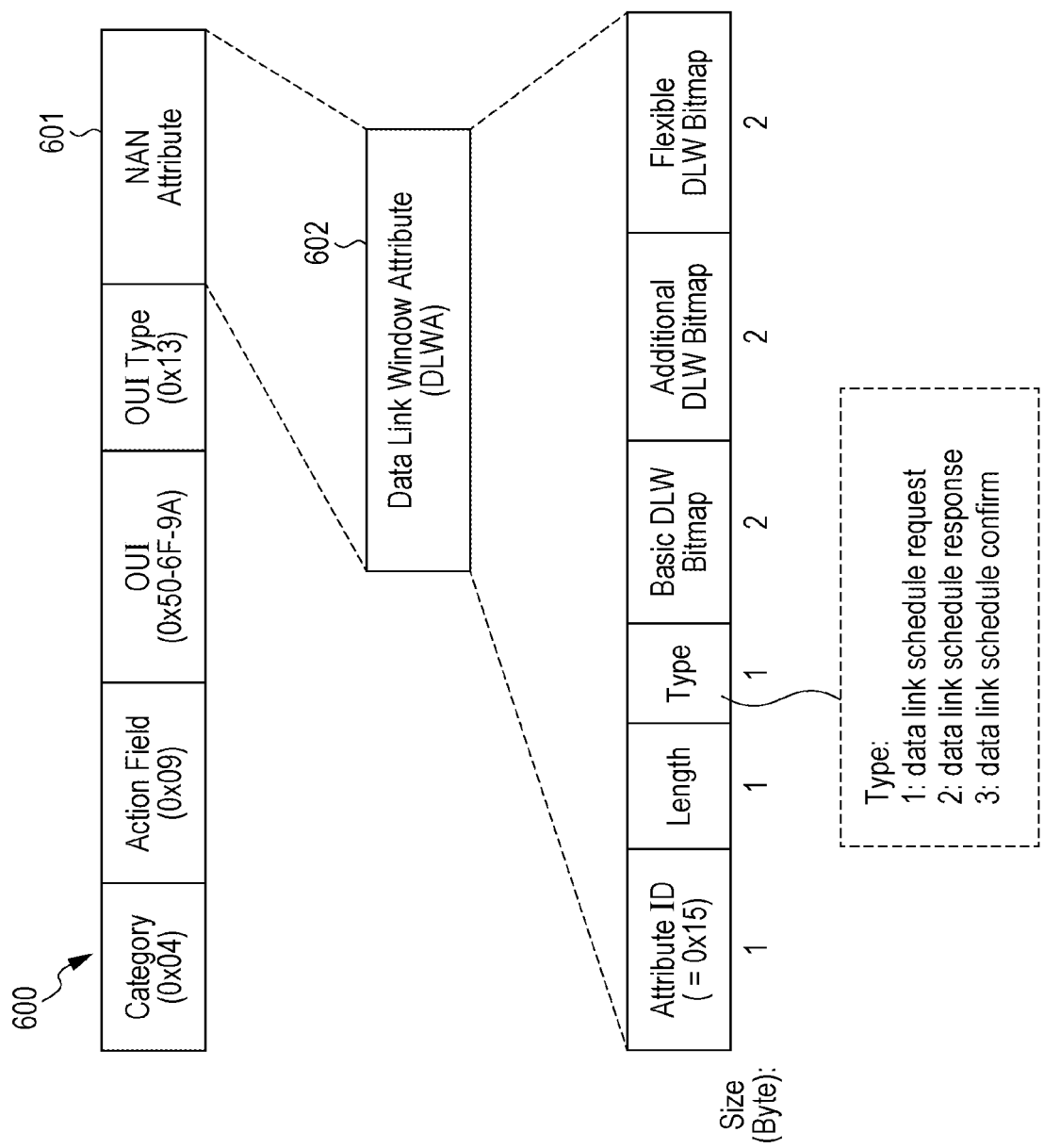

[Fig. 7]
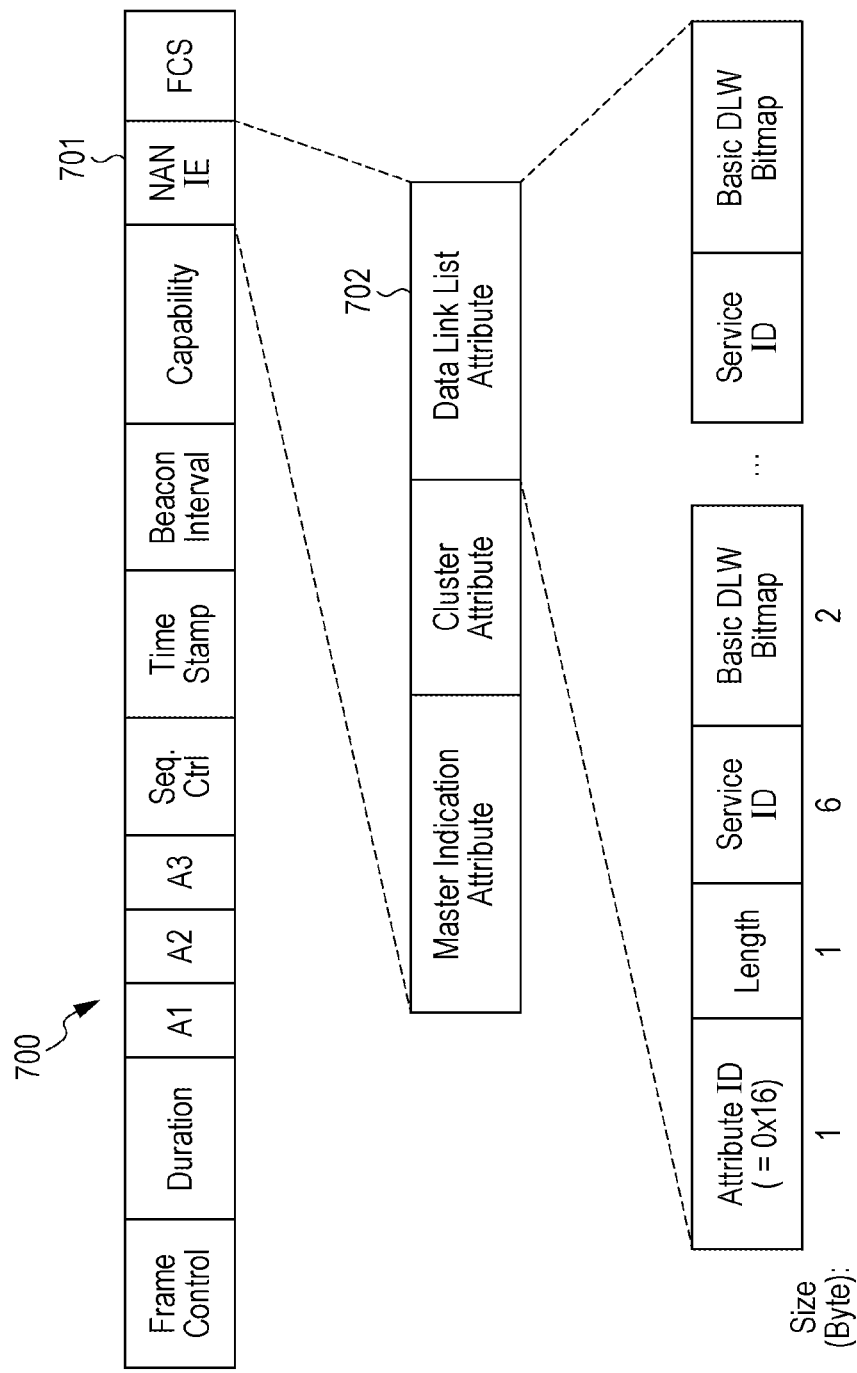

[Fig. 8]
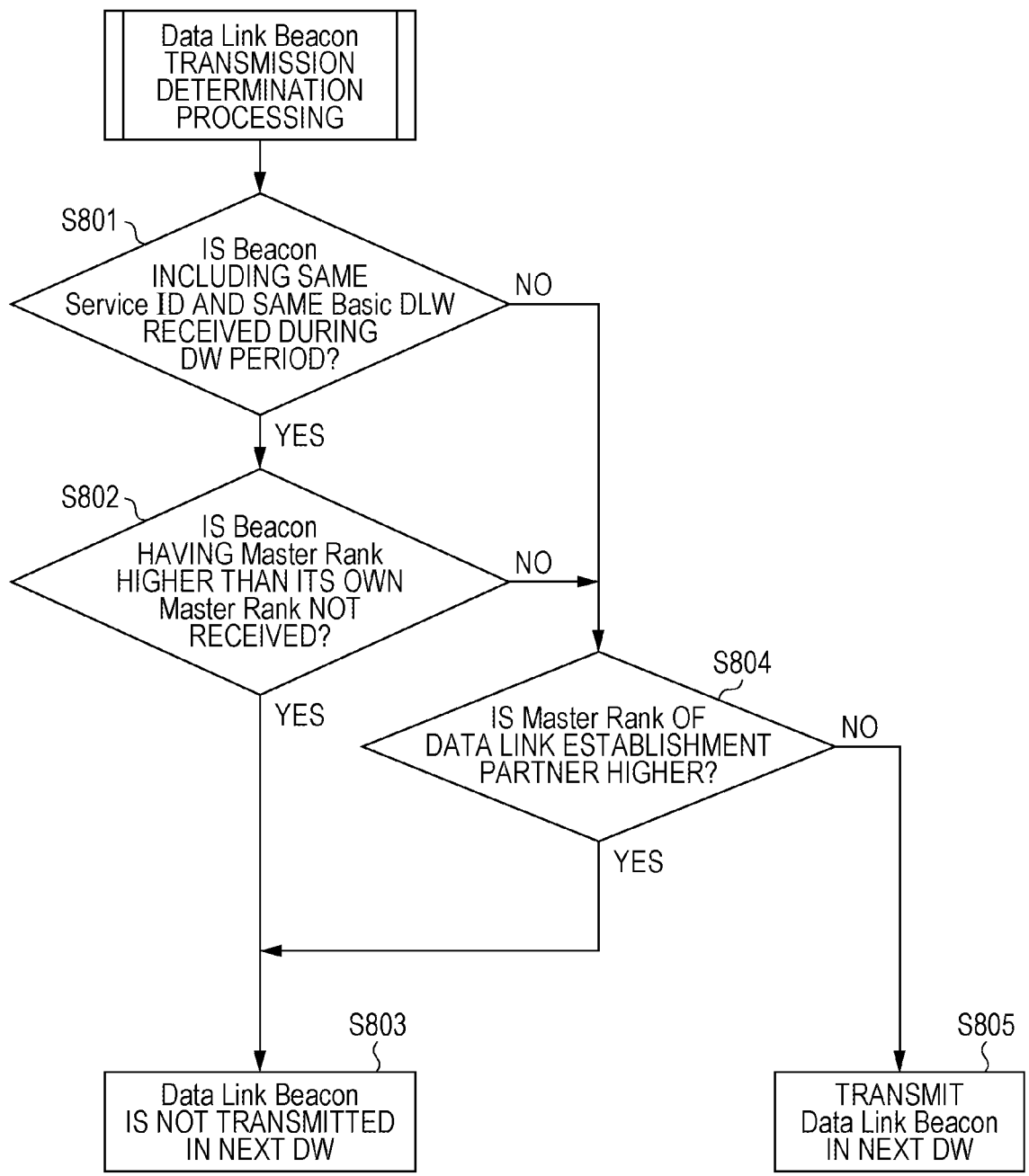

[Fig. 9]
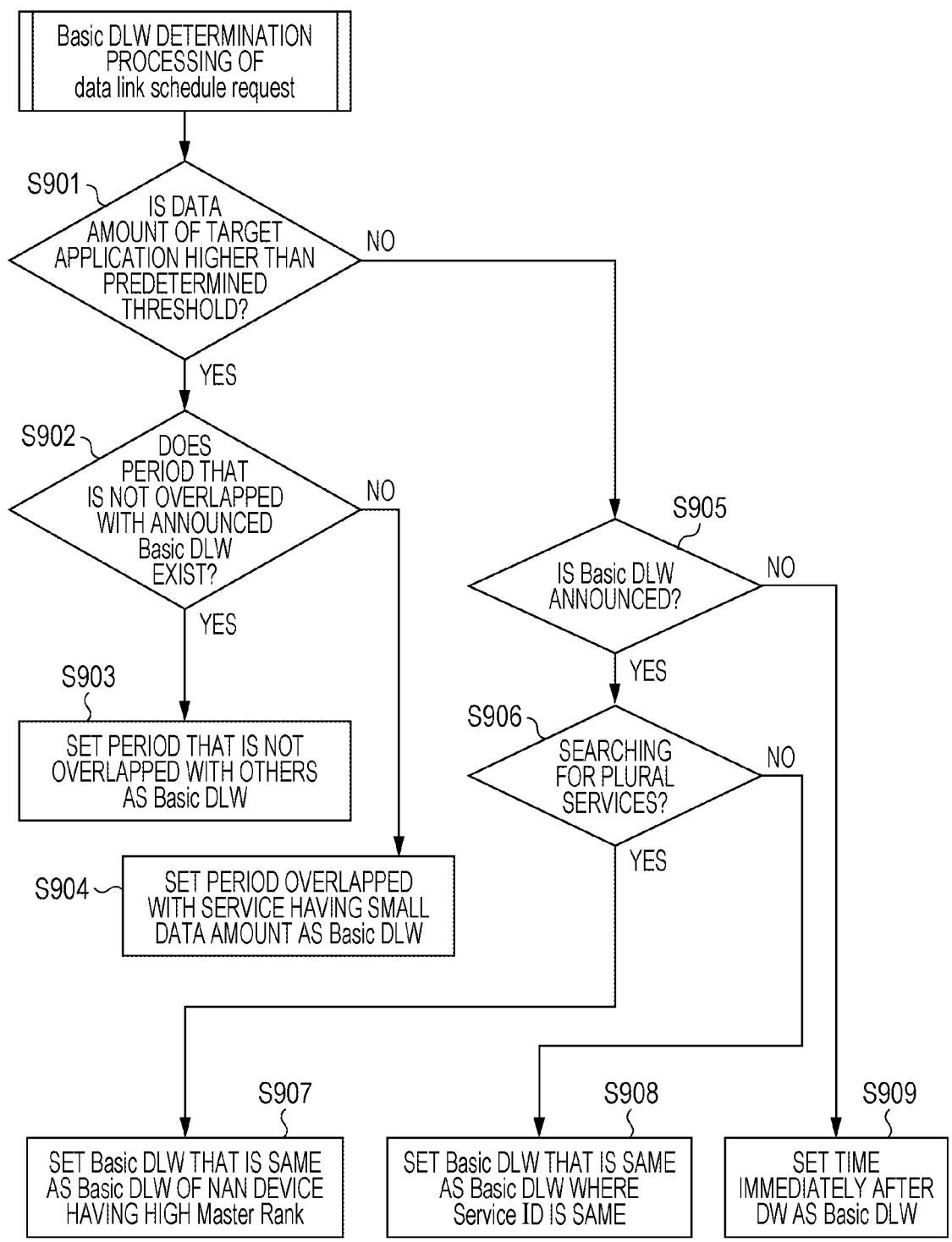

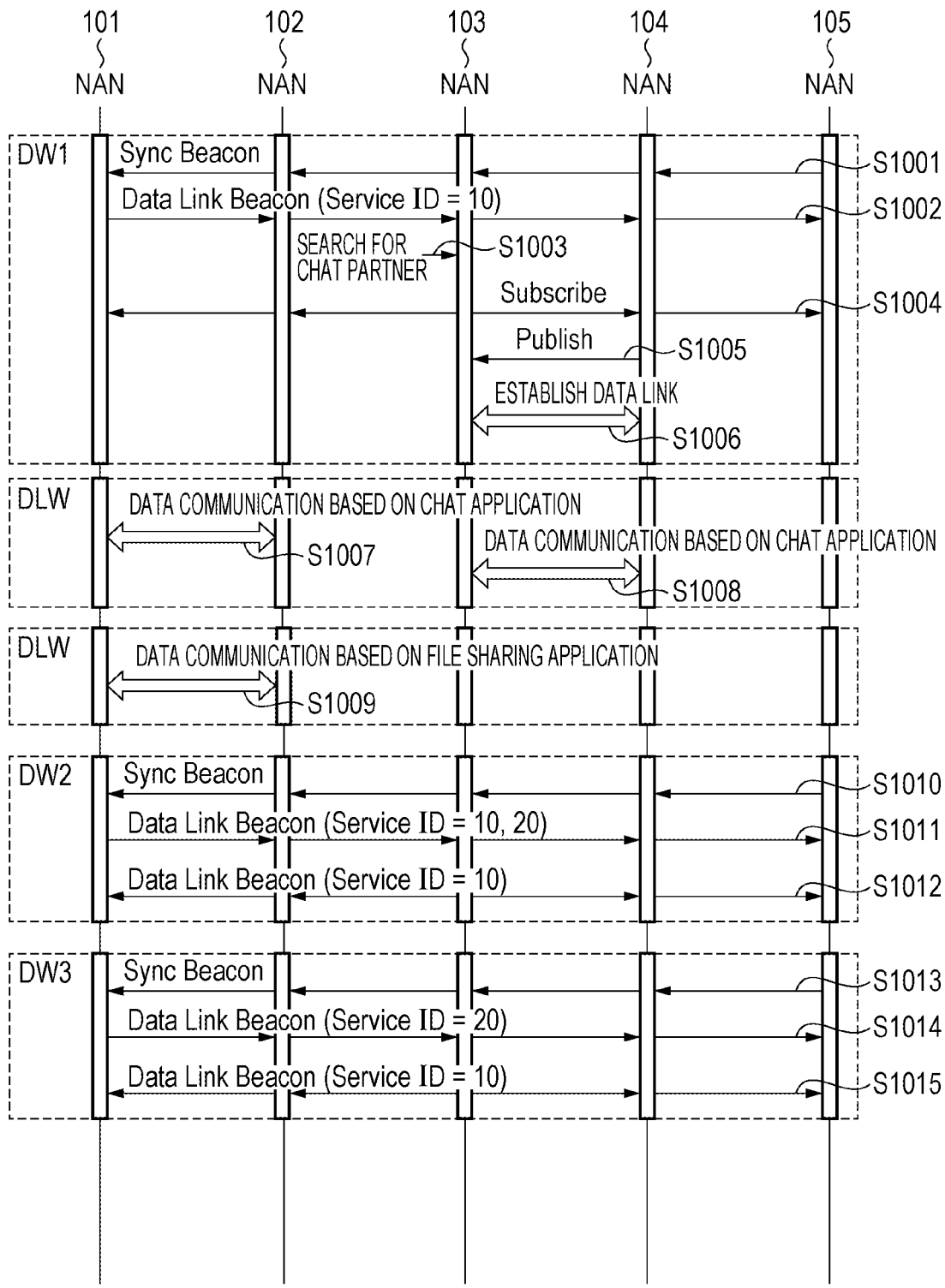
[Fig. 10]

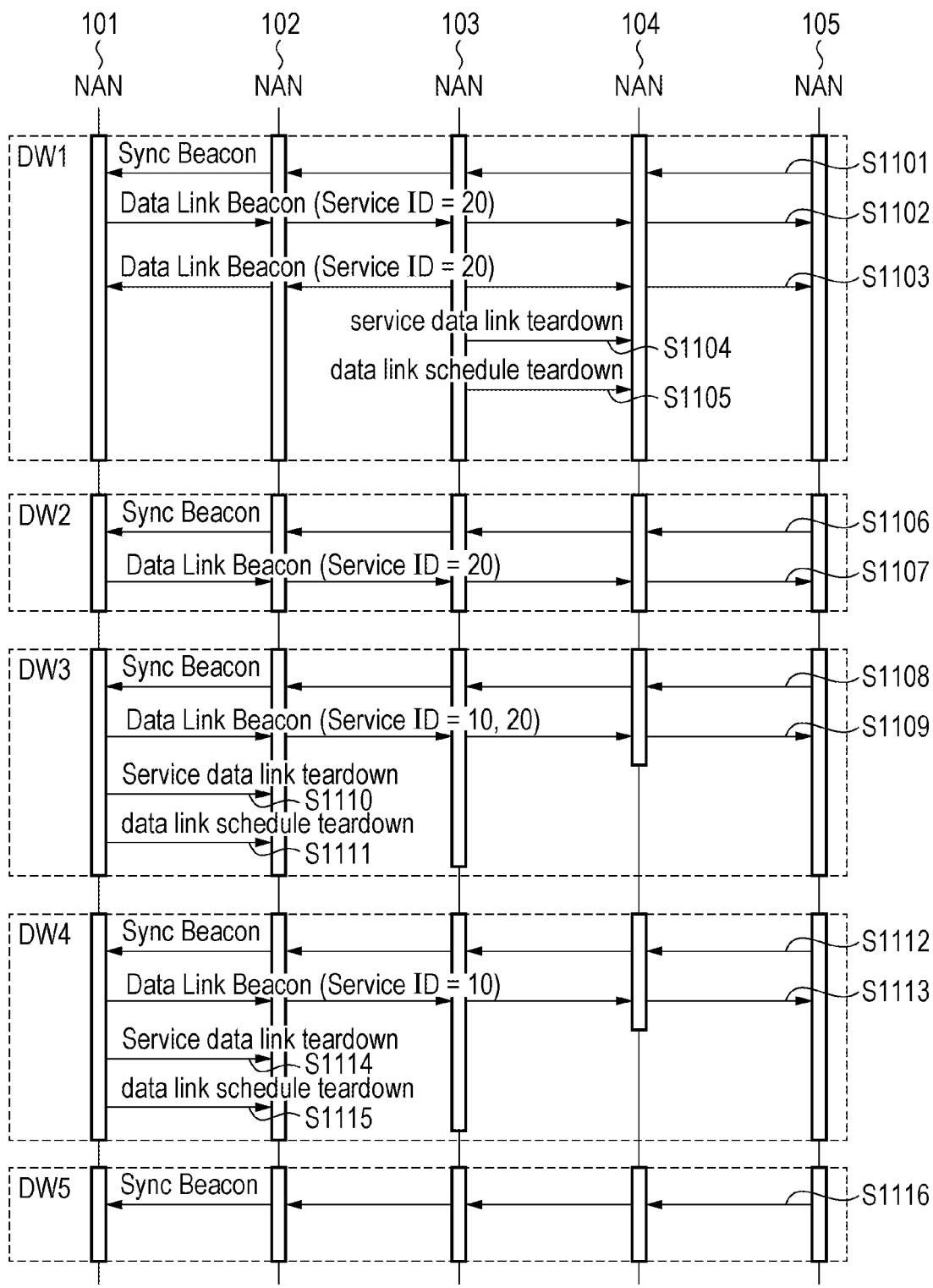
[Fig. 11]

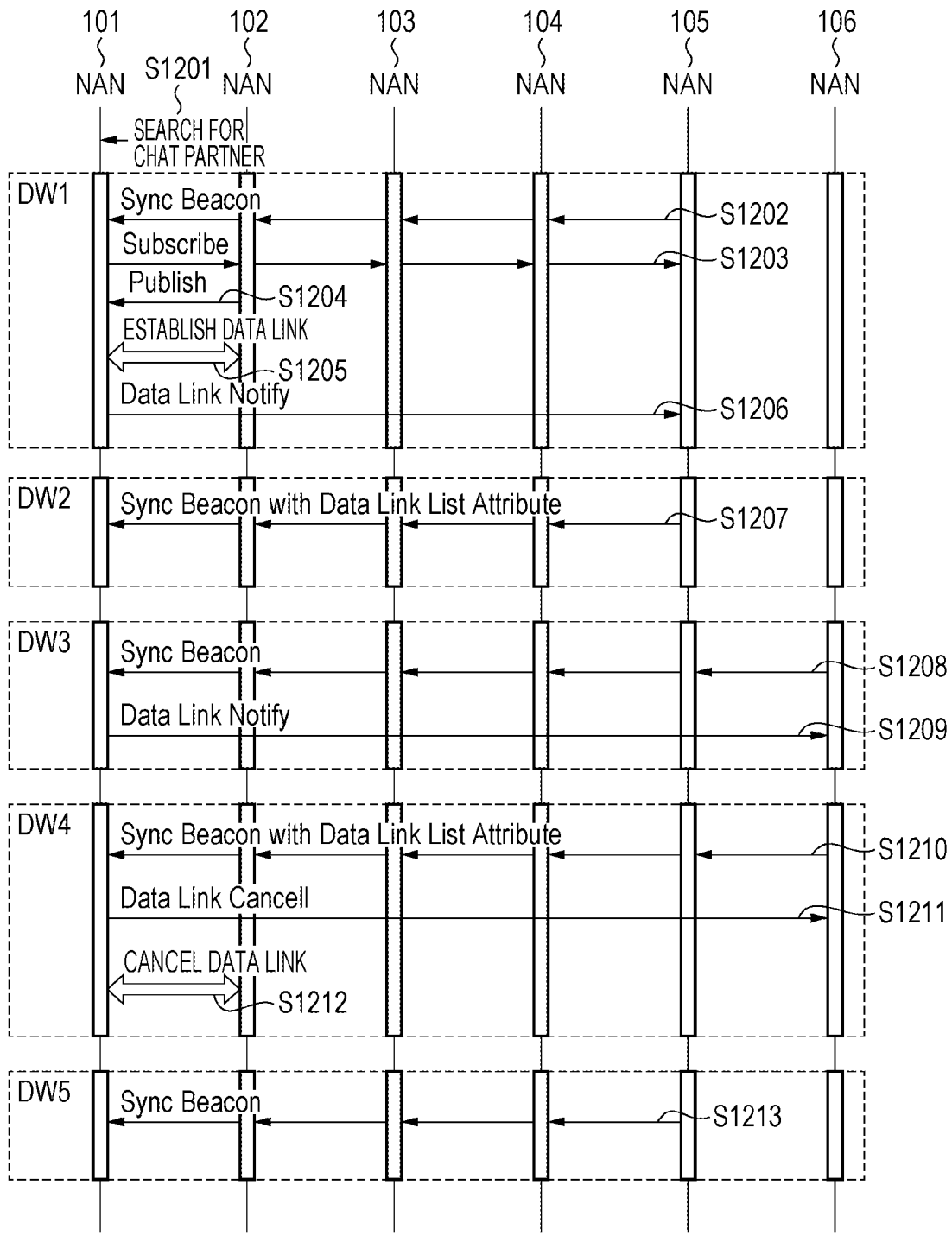
[Fig. 12]

COMMUNICATION APPARATUS, COMMUNICATION METHOD, AND PROGRAM

CROSS-REFERENCE TO RELATED APPLICATIONS

This application is a National Phase application of International Application No. PCT/JP2017/025242, filed Jul. 11, 2017, which claims the benefit of Japanese Patent Application No. 2016-143734, filed Jul. 21, 2016. The disclosures of the above-named applications and patent are hereby incorporated by reference herein in their entirety.

TECHNICAL FIELD

The present invention relates to a communication apparatus, a communication method, and a program.

BACKGROUND ART

In general, a wireless local area network (LAN) system represented by IEEE802.11 has been widely used. In the wireless LAN, the network is controlled by a base station called access point (hereinafter, which will be described as an AP). The wireless network is constituted by the AP and a station (STA) that exists in a ratio wave reaching range of the AP and is in a wirelessly connected state. In recent years, not only the above-described simple wireless network configuration based on the established AP and STA system but also various products and specification standards of the wireless LAN network modes have been proposed.

Neighbor Awareness Networking (NAN) has been defined by Wi-Fi Alliance as a communication standard for discovering a communication apparatus, a service provided by the communication apparatus, and the like in a power saving state (see PTL 1). According to the NAN, periods in which information is exchanged among the respective communication apparatuses constituting the NAN (hereinafter, which will be described as NAN devices) are synchronized with one another. With this configuration, when wireless RF is invalidated in a period other than the synchronized period, the time for validating the wireless RF can be shortened, and it is possible to realize the power saving. According to the NAN, the period for the synchronization is referred to as Discovery Window (DW). In addition, a set of NAN devices sharing a predetermined synchronized period is referred to as an NAN cluster.

The NAN devices can respectively play one of roles including Master, Non-Master Sync, and Non-Master Non-Sync in the NAN cluster. A terminal having the role of the Master transmits Sync Beacon corresponding to a signal with which the respective NAN devices in the same NAN cluster can be synchronized with one another during the DW period. After the synchronization is realized, the respective NAN devices in the NAN cluster mutually transmit and receive Subscribe signal corresponding to a signal for searching for a service and Publish signal corresponding to a signal for performing a notification that the service is provided during the DW period. Furthermore, the respective NAN devices can exchange Follow-up message for exchanging additional information relate to the service during the DW period. A frame of each message such as Publish message, Subscribe message, or the Follow-up message is referred to as Service Discovery Frame (SDF) according to the NAN standard, and a frame configuration thereof is defined by the NAN standard. The SDF includes Service ID corresponding to an identifier for identifying a target service. When the NAN devices mutually exchange the SDF, it is possible to discover and detect the service.

The NAN devices can discover and detect the service in the NAN cluster. However, after the service is discovered and detected, in a case where the NAN devices perform a communication based on an application for actually executing the service, the NAN devices need to establish Post NAN instead of the NAN. The Post NAN is a network different from the NAN cluster, that is, a network such as Infra network, IBSS, or Wi-Fi Direct other than the NAN. After the Post NAN network is established, the NAN devices can perform the communication based on the application.

Up to now, even when the mutual NAN devices that have already established the synchronization in the NAN cluster, the mutual NAN devices separately establish the new synchronization for the communication based on the Post NAN. For this reason, an issue occurs that the communication for executing the service is not promptly started.

On the other hand, another issue occurs that there are a case where a communication based on an application is desired to be performed during a period overlapped with a period in which the other NAN device performs a communication, and a case where, in contrast, a data communication based on an application is desired to be performed during a period that is not overlapped with the other period. For example, in a case of an application which which multiple people can chat, the NAN devices may perform the data communication with the other plural NAN devices. At this time, power consumption may be decreased when the NAN device sets a data communication period so as to be overlapped with the period in which the other plural NAN devices establish the data communication. On the other hand, in a case of an application with which moving image data is transferred, for example, since the amount of data to be communicated is large, the NAN devices expect to perform the communication while occupying a band. In the above-described case, the NAN device preferably sets a data communication period during a period that is not overlapped with the data communication period established by the other NAN devices.

The present invention has been made in view of the above-described circumstances and aims at efficiently executing a communication for executing a service with another communication apparatus that can execute a desired service.

CITATION LIST

Patent Literature

PTL 1: U.S. Patent Application Publication No. 2014/302787

SUMMARY OF INVENTION

A communication apparatus according to an aspect of the present invention to address the above-described issues has the following configuration. That is, the communication apparatus includes a first communication unit configured to perform a communication for establishing a data link during a cyclic first period in a network, a second communication unit configured to perform, in accordance with a data link established with another communication apparatus in the network via the communication by the first communication unit, a communication based on the data link with the other communication apparatus by using the established data link during a second period other than the first period, and an announcement unit configured to announce the second period within the network.

BRIEF DESCRIPTION OF DRAWINGS

FIG. 1 illustrates a wireless network configuration according to an embodiment.

FIG. 2 illustrates a functional configuration of an NAN device according to the embodiment.

FIG. 3 illustrates a hardware configuration of the NAN device according to the embodiment.

FIG. 4 is a sequence diagram according to the embodiment.

FIG. 5 is a configuration diagram of "service data link request/response" according to the embodiment.

FIG. 6 is a configuration diagram of "data link schedule request/response/confirm" according to the embodiment.

FIG. 7 is a flow chart of Basic DLW determination processing of the data link schedule request according to the embodiment.

FIG. 8 is a flow chart of Data Link Beacon transmission determination processing according to the embodiment.

FIG. 9 is a flow chart of the Basic DLW determination processing of the data link schedule request according to the embodiment.

FIG. 10 is a sequence diagram representing processing when an NAN device 103 and an NAN device 104 start a chat application.

FIG. 11 is a sequence diagram representing processing of cancelling an establishment of a data link.

FIG. 12 is a sequence diagram representing processing of establishing the data link and requesting Master in a network to announce Basic DLW.

DESCRIPTION OF EMBODIMENTS

Hereinafter, the present invention will be described in detail by way of embodiments with reference to the accompanying drawings. It should be noted that configurations illustrated according to the following embodiments are merely examples, and the present invention is not limited to the illustrated configurations.

First Embodiment

FIG. 1 illustrates a network configuration example according to the present embodiment. Hereafter, an example will be described in which a wireless LAN system in conformity to Neighbor Awareness Networking (NAN) standard is used. According to the NAN, service information is communicated during a period called Discovery Window (hereafter, which will be referred to as DW). The DW corresponds to a time and channel in which a plurality of devices that execute the NAN converge. A set of terminals sharing a schedule of the DW is referred to as an NAN cluster. It should be noted that the DW is generated at a constant cycle.

The respective terminals belonging to the NAN cluster operate as one of roles including Master, Non-Master Sync, and Non-Master Non-Sync. The terminal operating as the Master transmits Synchronization Beacon (hereinafter, which will be referred to as Sync Beacon) corresponding to a beacon with which the respective terminals identify the DW to be synchronized with one another. The terminal operating as the Master also transmits Discovery Beacon corresponding to a signal for causing terminals that do not belong to the NAN cluster to recognize the NAN cluster. The Discovery Beacon is transmitted outside the period of the DW, for example, at every 100 ms. It should be noted that at least one terminal operates as the Master in each of the NAN clusters.

The terminal operating as the Non-Master Sync transmits the Sync Beacon but does not transmit the Discovery Beacon. The terminal operating as the Non-Master Non-Sync does not transmit the Sync Beacon or the Discovery Beacon.

The terminals participating in the NAN cluster are synchronized with one another during the DW period at a predetermined cycle in accordance with the Sync Beacon and communicate the service information during the DW period.

The respective terminals mutually communicate Subscribe message corresponding to a signal for detecting or requesting a service during the DW period and Publish message corresponding to a signal for notifying that the service is provided. Furthermore, the respective terminals can exchange Follow-up message for exchanging additional information related to the service during the DW period. The respective terminals can advertise or detect the service by exchanging the messages such as the Publish message, the Subscribe message, and the Follow-up message.

In addition, according to the NAN, a process for detecting the service or the application and establishing a wireless connection for executing the service or the application is referred to as Post NAN. According to the Post NAN, the network is different from the NAN cluster, that is, a network other than the NAN such as Infra network, MSS, or Wi-Fi Direct. An NAN device establishes a new network and performs the communication based on the application.

In FIG. 1, NAN devices 101, 102, 103, 104, 105, and 106 are wireless communication apparatuses in conformity to the NAN standard. It should be noted that the NAN devices 101, 102, 103, 104, 105, and 106 may be any devices as long as the device can participate in the NAN and perform the communication based on the application. The NAN devices 101, 102, 103, 104, 105, and 106 can discover surrounding communication apparatuses and services provided by those surrounding communication apparatuses and provide the services on the basis of the NAN standard. In FIG. 1, the NAN devices 101, 102, 103, 104, 105, and 106 participate in an NAN cluster 107. The NAN devices 101, 102, 103, 104, and 106 participate in the NAN cluster 107 as the Non-Master No-Sync, and the NAN device 105 participates in the NAN cluster 107 as the Master or Anchor Master. According to the present embodiment, the NAN devices 101 and 103 are Subscribers that search for a predetermined service. The NAN devices 102 and 104 are Publishers that can respectively provide the predetermined services searched for by the NAN devices 101 and 103.

Master Ranks specified according to the NAN standard are set in the respective NAN devices. The Master Rank is a factor for determining a role in the NAN cluster. As the NAN device having a higher Master Rank is more likely to play the role of the Master, and the NAN device having a lower Master Rank is more likely to play the role of the Non-Master Non-Sync. In particular, the NAN device having the highest Master Rank in the NAN cluster is referred to as the Anchor Master and is a device that sets a reference of the time in the NAN cluster. According to the NAN standard, it is recommended that the NAN device stably participating in the NAN cluster, that is, for example, the NAN device that is driven by a power supply and does not move its position is set to have the high Master Rank. In addition, it is recommended that the NAN device that is driven by a battery or has a possibility that the NAN device does not stably exist in the NAN cluster like a mobile terminal is set to have the low Master Rank. The stably staying NAN device functions as the Master and transmits the synchronization signal, so that the NAN cluster can be stably maintained.

The NAN cluster 107 is a network in which the NAN devices 101, 102, 103, 104, 105, and 106 participate. According to the present embodiment, the NAN devices participating in the NAN cluster 107 constitute a network at 6 ch (2.437 GHz) in a frequency band of 2.4 GHz. The Discovery Window (DW) corresponding to the cyclic communication period in the network of the NAN cluster 107 is 16 Time Units (TU, 1 TU corresponds to 1024 microseconds), and an interval from the beginning of the DW to the beginning of the next DW is 512 TUs. It should be noted that wireless channel of the NAN and the length and the interval of the DW are not limited to the above.

FIG. 2 illustrates a functional configuration of the NAN device 101. It should be noted that functional configurations of the NAN devices 102, 103, 104, 105, and 106 are similar to that of the NAN device 101. A wireless LAN control unit 201 performs control for performing transmission and reception of a wireless signal with the other wireless LAN apparatus. The wireless LAN control unit 201 also performs wireless LAN control in conformity to IEEE802.11. An NAN control unit 202 performs control in conformity to the NAN standard. An NAN data link establishment control unit 203 controls the NAN control unit 202 to perform control for establishing a data link layer to perform the communication based on the application with the other NAN device. When the data link layer is established as a result of the processing by the NAN data link establishment control unit 203, the NAN device 101 can perform the data communication based on the application. According to the present embodiment, as an example, after the data link is established, the NAN device 101 can perform a communication based on IPv6.

An NAN data link communication control unit 204 uses the data link layer established by the NAN data link establishment control unit 203 to control the communication based on the application. The NAN device 101 can perform transmission and reception of IPv6 packets (that is, a communication of application data) under the control of the NAN data link communication control unit 204.

When the establishment of the data link layer is performed by the NAN data link establishment control unit 203, an NAN data link scheduling unit 205 controls a timing at which the communication based on the application is executed to perform scheduling with a communication partner. The NAN data link communication control unit 204 performs the communication of the application data at the timing scheduled by the NAN data link scheduling unit 205. The detailed processing for the scheduling will be described below with reference to FIG. 6.

An application control unit 206 performs control to execute the service discovered by the NAN. For example, when the NAN device 101 discovers a print service, the application control unit 206 performs control to execute an application for requesting a print job. Alternatively, in a case where the NAN device 101 discovers a photo sharing service, the application control unit 206 performs control for executing an application for exchanging photograph data. The NAN device 101 searches for a plurality of services and can also include the plurality of application control units 206. According to the present embodiment, for example, it is assumed that a chat application and a file sharing service are executed as the applications between the NAN device 101 and the NAN device 103. A user (not illustrated) of the NAN device 101 searches for a chat partner on the chat application. In addition, a user (not illustrated) of the NAN device 102 waits for the chat partner on the chat application. Furthermore, the user of the NAN device 101 searches for a file sharing partner on the file sharing service. In addition, it is assumed that the user of the NAN device 102 waits for the file sharing partner on the file sharing service. Moreover, according to the present embodiment, it is assumed that the chat application and the file sharing service are performed via the communication using the IPv6. Furthermore, it is assumed that the chat application and the file sharing service are executed as the applications between the NAN device 103 and the NAN device 104. An operation control unit 207 manages the operation performed with respect to an input unit 304 (FIG. 3) by the user of the NAN device 101 and transmits necessary signals to the other control units 201 to 206.

FIG. 3 illustrates a hardware configuration of the NAN device 101. It should be noted that hardware configurations of the NAN devices 102, 103, 104, 105, and 106 are similar to that of the NAN device 101. A storage unit 301 is constituted by one or both of a read only memory (ROM) and a random access memory (RAM) and stores various pieces of information including programs for performing various operations which will be described below, communication parameters for the wireless communication, and the like. It should be noted that storage media such as a flexible disc, a hard disc, an optical disc, a magneto-optical disc, a CD-ROM, a CD-R, a magnetic tape, a non-volatile memory, and a DVD may be used as the storage unit 301 in addition to the memory such as the ROM and the RAM.

A control unit 302 is constituted by a central processing unit (CPU) or a micro processing unit (MPU) and controls the entirety of the NAN device 101 by executing the program stored in the storage unit 301. It should be noted that the control unit 302 may also control the entirety of the NAN device 101 in cooperation with the programs stored in the storage unit 301 and an operating system (OS). The control unit 302 also controls a function unit 303 to execute predetermined processing such as image pickup, printing, or projection.

The function unit 303 is a hardware for the NAN device 101 to execute the predetermined processing. For example, in a case where the NAN device 101 is a camera, the function unit 303 is an image pickup unit and performs image pickup processing. For example, in a case where the NAN device 101 is a printer, the function unit 303 is a printing unit and performs printing processing. In addition, for example, in a case where the NAN device 101 is a projector, the function unit 303 is a projection unit and performs projection processing. Data processed by the function unit 303 may be data stored in the storage unit 301 or data communicated with the other NAN device via the communication unit 306 which will be described below.

The input unit 304 accepts the various operations from the user. An output unit 305 performs various outputs to the user. Herein, the output by the output unit 305 includes at least one of display onto a screen, audio output by a speaker, vibration output, and the like. It should be noted that both the input unit 304 and the output unit 305 may be realized by a single module like a touch panel.

A communication unit 306 performs control of a wireless communication in conformity to IEEE802.11 series and control of an internet protocol (IP) communication. In addition, the communication unit 306 controls an antenna 307 to perform transmission and reception of the wireless signal for the wireless communication. The NAN device 101 communicates contents such as image data, document data, and video data with the other NAN device via the communication unit 306.

FIG. 4 is a sequence diagram representing a series of flow including the discovery of the service, the establishment of the data link based on the NAN, and the application communication processing by way of the data link based on the NAN according to the present embodiment.

First, the user of the NAN device 101 causes the chat application to start processing of searching for the chat partner via the input unit 304 (S401). The NAN device 105 performs a notification of the DW period by the Sync Beacon (S402). The NAN device 101 does not transmit a signal (message) until the time reaches the DW period even when the search processing is started.

When the time reaches the DW period (DW1), the NAN device 101 transmits the Subscribe message by broadcast to search for the chat application (S403). At this time, to indicate that the chat application is searched for, an ID indicating the chat application is specified in Service ID (type of the service) included in the Subscribe message. Herein, the Service ID indicating the chat application is set as 10. When the NAN device 102 receives the Subscribe message for searching for the chat application, the NAN device 102 replies the Publish message indicating that the chat application is operating to the NAN device 101 (S404). At this time, the value 10 corresponding to the Service ID indicating the chat application is specified in the Service ID of the Publish message.

When the NAN device 101 receives the Publish message, the NAN device 101 transmits "service data link request" for requesting the establishment of the data link such that the communication can be performed by way of the chat application during the DW period (DW1) (S405). At this time, in a case where the DW period is ended, the NAN device 101 can transmit the service data link request during the next DW period. Alternatively, in a case where Further Service Availability is assigned in the Publish message in S404, the NAN device 101 may transmit the service data link request in accordance with the information. The Further Service Availability is information indicating that the service can be discovered and searched for at a time outside the DW period.

A frame of the service data link request message is referred to as Service Discovery Frame (SDF) according to the NAN standard, and a structure of the frame is defined by the NAN standard. The SDF according to the present embodiment is illustrated as an SDF 500 in FIG. 5. The SDF 500 is extended with respect to the SDF according to the NAN standard, and Data Link Setup Attribute (DLSA) 502 is added as NAN Attributes 501. While the DLSA 502 is included in the SDF 500, the NAN device 101 that transmits the SDF can request the establishment of the data link based on the NAN. In addition, Master Indication Attribute is included as the NAN Attributes 501. The Master Indication Attribute is attribute information specified according to the NAN standard and includes information of Master Preference indicating how likely the device becomes the Master and Random Factor. For this reason, when the frame including the Master Indication Attribute is received, the Master Rank of the NAN device that has transmitted the information can be identified.

As illustrated in FIG. 5, according to the present embodiment, attribute ID in the DLSA 502 is defined as 0x14. In addition, a value 1 (service data link request) indicating a request for establishing a data link in a predetermined service is specified in Type. It should be noted that a case where the value of the Type is 2 will be described below. The Service ID of the service desired to be communicated by using the data link is specified in the Service ID. That is, the value 10 indicating the chat application is specified in S405 of FIG. 4.

With reference to FIG. 4 again, when the NAN device 102 receives the service data link request, the NAN device 102 replies "service data link response" (S406). When these exchanges are completed, the NAN device 101 and the NAN device 102 mutually confirm to execute the data link communication based on the chat application as the service. The service data link response is illustrated in a format of the SDF 500 in FIG. 5. In the case of the service data link response unlike the service data link request, the value of the Type of the DLSA 502 becomes 2. In addition, according to the service data link response, the value 10 indicating the chat application is specified in the Service ID similarly as in S405.

After the NAN device 101 and the NAN device 102 mutually confirm to execute the data link communication for the chat application, the NAN device 101 and the NAN device 102 determine a timing for performing the data link communication.

When the NAN device 101 receives the service data link response, the NAN device 101 transmits "data link schedule request" (S407). This is a message for starting a negotiation to determine an interval outside the DW period when the data link communication is executed.

FIG. 6 illustrates an SDF 600 corresponding to a message for negotiating the interval when the data link communication is executed. The SDF 600 is extended with respect to the SDF according to the NAN standard. In the SDF 600, Data Link Window (DLWA) 602 is added as NAN Attributes 601 as being extended with respect to the SDF according to the NAN standard. While the DLWA 602 is included in the SDF 600, the NAN device 101 that transmits this SDF can perform the negotiation for the scheduling to determine the interval outside the DW period at the time of the data link communication based on the NAN when the conununication is executed. A method of determining whether or not the request is made for the NAN device 102 regarding the interval when the communication is actually executed will be described below with reference to a flow chart of FIG. 7.

As illustrated in FIG. 6, according to the present embodiment, the Attribute ID in the DLWA 602 is defined as 0x15. In addition, a value 1 (data link schedule request) is specified in the Type as a value for requesting the start of the scheduling. It should be noted that a case where the value of the Type is 2 and a case where the value is 3 will be described below.

An interval outside the DW period when the data link communication is requested is specified by Basic DLW Bitmap, Additional DLW Bitmap, and Flexible DLW Bitmap.

The data link interval specified by a value of the Basic DLW Bitmap is an interval, in a case where the NAN device establishes the data link with one or more of the NAN devices, which is requested as an interval in which the data link communication is commonly performed by the plurality of those NAN devices. That is, after the NAN device establishes the data link with the single NAN device, in a case where the establishment of the data link with the other NAN device is requested while the data link is maintained, the same Basic DLW Bitmap may be specified.

The data link interval specified by a value of the Additional DLW Bitmap and a value of the Flexible DLW Bitmap may be set as different values among the respective NAN devices that establish the data link. These values may be exclusively specified in a case, for example, where the NAN device desires to perform the data link communication for the large volume of data with the specific NAN device and also does not desire to perform the data link communication with the other NAN device in the interval.

The Additional DLW Bitmap is a candidate of the data link interval that is not to be rejected in "data link schedule confirm" that may be transmitted as a confirmation after the NAN device receives "data link schedule response". On the other hand, the Flexible DLW Bitmap is a candidate of the data link interval that may be rejected in the data link schedule confirm that may be transmitted as a confirmation after the NAN device receives the data link schedule response.

Respective bits of the values of the respective DLW Bitmaps may specify how far the period in which the communication based on the NAN data link is performed is away from the DW period. Specifically, in a case where the start of the DW period is set as 0 TU and the time immediately the end of the DW period is set as 16 TU, the DLW Bitmap in which the N-th bit is 1 indicates a possibility that the communication based on the data link may occur during a period from (N+1)×16 TU to (N+2)×16 TU. For example, the DLW Bitmap in which 0th bit is 1 indicates a possibility that the communication based on the data link may occur during a period from 16 TU to 32 TU, and the DLW Bitmap in which the 2nd bit is 1 indicates a possibility that the communication based on the data link may occur during a period from 48 TU to 64 TU. A value 1 may be specified with respect to the plurality of bits in the DLW Bitmap. In this manner, it is possible to specify the period during which the communication based on the data link can be performed in units of the same time width as the DW period during the period outside the DW period. It should be noted that the technique for specifying the period when the communication based on the data link is executed is not limited to the above-described technique as long as a period outside the DW period is specified.

According to the present embodiment, the period specified by the Basic DLW can be announced to the other NAN device. As a result, the power consumption may be reduced while the other NAN device that has received the announced Basic DLW effectively utilizes the bands by setting the data communication period in a manner that the bands are not overlapped with each other or while the bands are overlapped with each other on the other hand. How the Basic DLW is determined will be described below with reference to FIG. 9.

FIG. 9 is a flow chart illustrating processing when the NAN device 101 determinates the Basic DLW of the data link schedule request. The flow chart illustrated in FIG. 9 may be realized when the control unit 302 of the NAN device 101 executes the control program stored in the storage unit 301 to execute calculation and process on the information and control on the respective hardware. When the NAN device 101 determines the Basic DLW, first, the NAN device 101 determines whether or not the data communication amount in the application that attempts to establish the data link (target application) is higher than a predetermined threshold (S901). It should be noted that, in S901, the configuration is not limited to the comparison with the predetermined threshold, and it may be determined whether or not the data communication amount is relatively high from an empirical value. According to the present embodiment, it is assumed that the chat service attempts to establish the data communication in S406, and the data communication amount is lower than the predetermined threshold. For this reason, No is determined in S901, and next, the NAN device 101 determines whether or not Data Link Beacon including the Basic DLW is announced (S905). The Data Link Beacon is a frame for announcing the period in which the data link is established to the surrounding NAN device, and the frame will be defined with reference to FIG. 7 below.

At this time, since the NAN device that transmits the Data Link Beacon does not exist yet, No is determined in S905. In this case, the NAN device 101 sets "immediately after the DW", which is previously set in each of the NAN devices as a specified value of the Basic DLW, as the Basic DLW (S909). The value previously set in each of the NAN devices as the specified value of the Basic DLW is not limited to "immediately after the DW", but in the case of "immediately after the DW", since it is not necessary to frequently turn on and off the wireless transmission and reception, the processing is accordingly simplified.

As a result of the above-described processing, the value 0x0001 is stored in the Basic DLW Bitmap of the data link schedule request transmitted in S407. That is, this is a value indicating 16 TUs (16 TU to 32 TU) immediately after the DW period.

With reference to FIG. 4 again, when the NAN device 102 receives the data link schedule request, the NAN device 102 replies the data link schedule response (S408). A value 2 indicating that the Type of the DLWA 602 is a response to the data link schedule request is specified in the data link schedule response in the SDF 600 (FIG. 6). In addition, at this time, the period in which the NAN device 102 itself desires to perform the data link communication outside the DW period is indicated by the respective DLW Bitmaps by using a method similar to that of the data link schedule request. At this time, the respective DLW Bitmaps do not necessarily need to be matched with the respective DLW Bitmaps of the data link schedule request, and the NAN device 102 may specify a desired period. It should be noted however that, when the respective DLW Bitmaps of the data link schedule request are matched with those of the data link schedule response, the communication in the data link can be more promptly started.

When the NAN device 101 receives the data link schedule response, the NAN device 101 transmits the data link schedule confirm to confirm the period in which the data link communication can be performed in the end (S409). A value 3 indicating that the Type of the DLWA 602 is the response to the data link schedule response is specified in the data link schedule confirm in the SDF 600 (FIG. 6).

At this time, when the values of the Basic DLW Bitmap in the received data link schedule response and the Additional DLW Bitmap are included in or matched with the values of the Basic DLW Bitmap and the Additional DLW Bitmap specified by the data link schedule request in S407, the NAN device 101 matches the values of the Basic DLW Bitmap and the Additional DLW Bitmap in the data link schedule confirm with the values of the Basic DLW Bitmap and the Additional DLW Bitmap in the received data link schedule response.

On the other hand, a value other than the value indicated by the Flexible DLW Bitmap of the data link schedule response is not specified in the Flexible DLW Bitmap but does not necessarily need to be matched. For example, it is sufficient when the value is in the subset. Herein, it is assumed that the NAN device 101 specifies 0x4 in the Flexible DLW Bitmap in the data link schedule request in S407, but 0x5 is specified in the data link schedule response in S408. At this time, since the mutual periods in which the data link communication is desired to be performed are not matched with each other, the NAN device 101 returns the Flexible DLW Bitmap as 0x0.

According to the present embodiment, when the NAN device 101 confirms in the data link schedule confirm that the NAN device 101 and the NAN device 102 agree to execute the data link communication while the Basic DLW is set as the period from 16 TU to 32 TU. With this configuration, the data link based on the NAN is established, and the NAN device 101 and the NAN device 102 are both put into a state in which the communication based on the chat application can be performed. Subsequently, thereafter, the wireless transmission and reception of the packets are executed during not only the DW period but also the DLW period specified by data link setup confirm. That is, the NAN device 101 and the NAN device 102 can perform the communication based on the data link in a state in which the communication during the DW period can be continued.

When a state in which chat can be performed is established, the data communication based on the chat application can be performed during the period specified by the Basic DLW. Herein, since the NAN device 101 and the NAN device 102 have negotiated that the data communication based on the chat application is performed during the period from 16 TU to 32 TU in S407 to S409, the communication based on the chat application may be performed immediately after the DW (S410).

Furthermore, when the data link is established in S409, one of the NAN device 101 and the NAN device 102 announces the Data Link Beacon to notify the surrounding NAN device of the established data link. The announcement of the Data Link Beacon by one of the NAN device 101 and the NAN device 102 will be described below with reference to FIG. 8.

FIG. 7 illustrates an example of a format of the Data Link Beacon according to the present embodiment as Data Link Beacon 700. The Data Link Beacon 700 is obtained by extending Beacon according to IEEE802.11 standard. The Data Link Beacon 700 is transmitted to announce that the NAN device establishes the data link and announce the currently used Basic DLW to the other NAN device. As indicated by NAN IE 701, the NAN IE includes Data Link List Attribute defined according to the present embodiment in addition to the Master Indication Attributes and Cluster Attribute specified by the NAN standard. The Cluster Attribute includes information related to Anchor Master Rank corresponding to the Master Rank of the Anchor Master, the number of hops to the Anchor Master, and the timing for the Anchor Master to transmit the Beacon. As illustrated in FIG. 7, according to the present embodiment, the Attribute ID in the Data Link List Attribute is defined as 0x16. The NAN device that has received the Beacon including this Data Link List Attribute can recognize that this Beacon is the Data Link Beacon. Length includes the number of included bytes of the Data Link List Attribute after the Length. The Service ID and the Basic DLW Bitmap store the Service ID of the service where the data link is established and the Basic DLW Bitmap of the data link as a pair. Furthermore, as illustrated in FIG. 7, a plurality of pairs of the Service IDs and the Basic DLW Bitmaps may be stored. That is, in a case where the data links are established in the plurality of services, the plurality of the Service IDs and the Basic DLW Bitmaps are included. At the time corresponding to S410, since only the NAN device 101 and the NAN device 102 establish one data link each, one pair of the Service ID and the Basic DLW Bitmap is included.

FIG. 8 is a flow chart illustrating Data Link Beacon transmission (announcement) determination processing according to the present embodiment. After the NAN devices 101 to 106 establish the data link, the present processing continues to be executed regularly. For example, after S409 in FIG. 4, the NAN device 101 and the NAN device 102 execute the present processing. The flow chart illustrated in FIG. 8 may be realized when the control unit 302 of the NAN device 101 executes the control program stored in the storage unit 301 to execute calculation and process on the information and control on the respective hardware.

First, the NAN devices 101 and 102 respectively determine whether or not the Data Link Beacon including the same the Service ID and the same Basic DLW as the Service ID and the Basic DLW included in the Data Link Beacon that may be transmitted by the NAN devices is received during the DW period (S801). Since the NAN device that transmits the Data Link Beacon does not exist at the time corresponding to S409 (S801: No), next, the NAN devices 101 and 102 determine whether or not the partner NAN device that has established the data link has the higher Master Rank (S804). The Master Rank of the partner NAN device can be identified from the service data link request or the service data link response received in S405 or S406.

Since the NAN device 101 has the higher Master Rank than that of the NAN device 102, No is determined in S804, and the NAN device 101 determines that the Data Link Beacon is to be transmitted in the next DW (S805). On the other hand, since the NAN device 102 has the lower Master Rank than that of the NAN device 101. Yes is determined in S804, and it is determined that the Data Link Beacon is not to be transmitted in the next DW (S803). As a result of the present processing, one of the NAN device 101 and the NAN device 102 transmits the Data Link Beacon including the common Service ID and Basic DLW.

A case will be considered where the present processing is not executed, and the NAN device 101 and the NAN device 102 respectively transmit the Data Link Beacon having the same contents of the Data Link List Attribute (the Service ID and the Basic DLW). In this case, since both the NAN devices transmit the Data Link Beacon irrespective of the same information, the wireless band is unnecessary is consumed. For this reason, there is a possibility that, in a case where the band is unnecessary occupied during the DW having the short period of 16 TUs, it becomes difficult for the other NAN device to transmit the Subscribe message and the Publish message for discovering the service. When the present processing is performed, it is possible to avoid the state in which it takes time to perform the discovery and the search of the service.

In addition, it is sufficient when the NAN device that transmits the Data Link Beacon is not determined in accordance with the Master Rank alone. For example, even in a case where the NAN device receives the Data Link Beacon from the other NAN device having the high Master Rank, if a radio field intensity of the Data Link Beacon is low, the NAN device may announce the Data Link Beacon. In a case where the NAN device receives the Data Link Beacon having the low radio field intensity, there is a possibility that the other NAN device located in the vicinity of the NAN device does not receive the Data Link Beacon. For this reason, the other NAN device may establish the NAN data link of the Basic DLW different from the Basic DLW of the NAN device. In view of the above, in a case where the NAN device receives the Data Link Beacon having the low radio field intensity from the other NAN device having the high Master Rank, the Data Link Beacon including the same Basic DLW as the Service ID of the NAN device is preferably transmitted during the DW period.

Descriptions will be given with reference to FIG. 4 again. After the data link is established (S410), when the time reaches the DW period (DW2), the NAN device 105 transmits the Sync Beacon corresponding to the frame for the synchronization again (S411). Furthermore, when the time reaches the DW period, the NAN device 101 transmits the Data Link Beacon in accordance with the processing of FIG. 8 (S412). At this time, the value 10 indicating the chat application is stored in the Service ID of the Data Link List Attribute of the Data Link Beacon, and a value 0x0001 is stored in the Basic DLW Bitmap. It should be noted that the order of the processing in S411 and the processing in S412 may be swapped. Next, the user of the NAN device 101 searches for a file sharing partner to share a file with the user of the NAN device 102 via an operation with respect to the input unit 304 (FIG. 3) (S413).

The NAN device 101 transmits the Subscribe message by broadcast to search for a file sharing application (S414). At this time, an ID indicating the file sharing application is specified in the Service ID included in the Subscribe message to indicate that the file sharing application is searched for. Herein, the Service ID indicating the file sharing application is set as 20. When the NAN device 102 receives the Subscribe message indicating that the file sharing application is searched for, the NAN device 102 replies the Publish message indicating that the file sharing application is operating to the NAN device 101 (S415). At this time, a value 20 corresponding to the Service ID indicating the file sharing application is specified in the Service ID of the Publish message.

Subsequently, the NAN device 101 establishes the data link by a sequence similar to S405 to S409 (S416). Processing of determining the Basic DLW Bitmap of the data link schedule request transmitted by the NAN device 101 at this time will be described with reference to FIG. 9.

First, the NAN device 101 determines whether or not the data communication amount of the file sharing application set as the target application is higher than a predetermined threshold (S901). According to the present embodiment, the file sharing application has the higher data communication amount for sharing the file than the predetermined threshold (S901: Yes). Subsequently, the NAN device 101 determines whether or not a period that is not overlapped with the Basic DLW included in the announced Data Link Beacon exists (S902). Herein, the NAN device 101 also determines at the same time whether or not a period that is not also overlapped with the Basic DLW of the Data Link Beacon announced by itself exists. In a case where the start of the DW period is set as 0 TU, the DW period is 0 TU to 16 TU, and the Basic DLW announced by the NAN device 104 in S412 is 16 TU to 32 TU. Therefore, the NAN device 101 can determine that the remaining period, that is, 32 TU to 512 TU, is the period that is not overlapped with the Basic DLW included in the announced Data Link Beacon (S902: Yes). Next, the NAN device 101 selects the period determined in S902 as the Basic DLW of the data link schedule request (S903). It should be noted that, at this time, the NAN device 101 preferably selects a part of the period that is not overlapped in accordance with the data communication amount. Herein, the NAN device 101 sets the period from 48 TU to 80 TU as the Basic DLW of the file sharing application. That is, the Basic DLW Bitmap of the data link schedule request becomes 0x000C. Herein, the subsequent descriptions will be given while it is assumed that the NAN device 102 accepts the above-described Basic DLW in S416.

In S902, if the NAN device 101 receives the plurality of Data Link Beacons and the other NAN device establishes the data link during the entire period outside the DW period (S902: No), the processing proceeds to S904. In S904, the NAN device 101 sets the period overlapped with the service having the least data communication amount as the Basic DLW. For example, in a case where the data link of the Service ID=10 (chat application) and the Service ID=20 (file sharing application) in the Data Link Beacon is established, the NAN device 101 sets the Basic DLW as the same Basic DLW as the Service ID=10. With this configuration, the probability is increased that the NAN device 101 can communicate during the period in which the band is not congested relatively.

When the NAN device 101 and the NAN device 102 establish the data link in S416, the NAN device 101 and the NAN device 102 execute the Data Link Beacon transmission determination processing illustrated in FIG. 8 again. Since the NAN device 101 and the NAN device 102 have not received the Data Link Beacon of the Service ID indicating the file sharing application, No is determined in S801. Since the NAN device 101 has the high Master Rank, No is determined in S804, and it is determined that the NAN device 101 transmits the Data Link Beacon in the next DW (S805). On the other hand, since the NAN device 102 has the low Master Rank, Yes is determined in S804, and it is determined that the NAN device 102 does not transmit the Data Link Beacon (S803).

Descriptions will be given with reference to FIG. 4 again. When the DW period (DW2) is ended, the NAN device 101 and the NAN device 102 may perform the data link communication based on the chat application during the period of 16 TUs immediately after the DW period (S417). During the period of 32 TUs after 16 TUs since the DLW period of the chat application is ended, the NAN device 101 and the NAN device 102 may perform the data link communication based on the file sharing application established in S416 (S418). Subsequently, when the time reaches the next DW period (DW3), the NAN device 105 operating as the Master transmits the Sync Beacon for the notification of the DW period (S419). In addition, the NAN device 101 transmits the Data Link Beacon on the basis of the processing of FIG. 8 (S420). At this time, the NAN device 101 preferably transmits the DLW for the chat application and the DLW for the file sharing application in one frame by using the Data Link Beacon from the viewpoint of the mitigation in the occupancy of the wireless band. That is, for example, in the Data Link List Attribute illustrated in FIG. 7, the values 10 and 0x0001 are respectively stored in the Service ID and the Basic DLW Bitmap of the first pair, and the values of 20 and 0x000C are respectively stored in the Service ID and the Basic DLW Bitmap of the second pair.

FIG. 10 is a sequence diagram representing a series of processing flow when the NAN device 103 and the NAN device 104 start the chat application after the processing of FIG. 4.

At the start of the DW period (DW1), the NAN device 105 transmits the Sync Beacon (S1001). Similarly as in S420, the NAN device 101 transmits the Data Link Beacon (S1002). Thereafter, a user of the NAN device 103 searches for the chat partner to chat with a user of the NAN device 104 via the operation with respect to the input unit 304 (FIG. 3) (S1003). The NAN device 103 transmits the Subscribe message of the Service ID including the value 10 indicating the chat application (S1.004). In response to this, the NAN device 104 replies the Publish message to the NAN device 103 (S1005). Subsequently, the NAN device 103 and the NAN device 104 perform the establishment of the data link for the chat application similarly as in the processing in S405 to S409 (S1006).

In S1006, processing for the NAN device 103 to determine the Basic DLW for the chat application will be described with reference to FIG. 9 again. First, the NAN device 103 determines whether or not the data communication amount of the chat application is higher than a predetermined threshold (S901). Since the data communication amount of the chat application is not higher than the predetermined threshold (S901: No), next, the NAN device 103 determines whether or not the Data Link Beacon including the Basic DLW is announced (S905). In S1002, the NAN device 103 has received the Data Link Beacon (S905: Yes), next, it is determined whether or not the NAN device 103 searches for a plurality of services (S906). Herein, the determination on whether or not the NAN device 103 searches for the plurality of services is the determination on whether or not services other than the chat application are searched for. Alternatively, the determination on whether or not the plurality of services are searched for may be the determination on whether or not the application for searching for the service is activated even when the services are not searched for. In addition, the determination on whether or not the plurality of services are searched for may be the determination on whether or not the application that can establish the data link based on the NAN is installed. In S906, the NAN device 103 determines whether or not a possibility exists that the data links are established in the plurality of services, and the method therefor is not limited to the above.

Since the NAN device 103 does not search for the plurality of services (S906: No), the Basic DLW is set as the same value as the Basic DLW where the Service ID is the same (S908). That is, in a case where the start of the DW period is set as 0, the NAN device 103 sets 16 TU to 32 TU as the Basic DLW of the chat application. As a result, the communication period based on the data link of the chat application of the NAN device 101 and the NAN device 102 and the communication period based on the data link of the chat application of the NAN device 103 and the NAN device 104 become the same DLW period (S1007 and S1008). With this configuration, in a case where the data link is established in the service having the low data communication amount like the chat application, while the communication periods of the data links are set as the same period, the occupancy of the wireless band with respect to the other service can be avoided. In addition, a case will be considered where the NAN device 102 and the NAN device 103 thereafter establish the data link for performing the data link communication based on the chat application. At this time, while the data link is established in the Basic DLW during the similar period, the NAN device 103 can decrease the period in which the wireless communication is on. That is, in a case where the start of the DW period is set as 0 TU, it is sufficient when the NAN device 103 turns the wireless communication on only during the period from 16 TU to 32 TU even in a case where the data link communication in the chat application is performed with the NAN device 102 and the NAN device 104. The wireless communication can be turned off during the remaining period from 32 TU to 512 TU, and it is possible to reduce the power consumption.

It should be noted that, if the NAN device 103 searches for the plurality of services (S906: Yes), the Basic DLW is set to have the same value as the Basic DLW included in the Data Link Beacon received from the NAN device having the high Master Rank (S907). Alternatively, while the processing in S906 and S907 is omitted, the flow may proceed to S908 in a case where Yes is determined in S905. On the other hand, in S908, in a case where the announced Service ID and the Service ID with respect to the established data link are not the same, the NAN device may set the Basic DLW corresponding to the announced Service ID as the Basic DLW. Alternatively, in this case, the NAN device may also set a period other than the Basic DLW corresponding to the announced Service ID as the Basic DLW.

Subsequently, the NAN device 101 and the NAN device 102 may perform the communication based on the data link during the DLW period based on the file sharing application during a period from 48 TU to 80 TU (S1009).

When the time reaches the next DW period (DW2), the NAN device 105 operating as the Master transmits the Sync Beacon (S1010). Next, the NAN device 101 transmits the Data Link Beacon with regard to the chat application and the file sharing application in accordance with the processing of FIG. 8 (S1011). Similarly, with regard to the NAN device 103 and the NAN device 104, the NAN device 103 having the high Master Rank transmits the Data Link Beacon for the notification of the Basic DLW of the chat application (S1012). The NAN device 104 having the lower Master Rank than that of the NAN device 103 does not transmit the Data Link Beacon.

The NAN device 101 executes the processing of FIG. 8 again immediately before the next DW period (DW3). At this time, in S1012, the NAN device 101 receives the Data Link Beacon including the same Service ID(=10) and the same Basic DLW (=0x0001) as those transmitted by itself (S801: Yes). Then, the NAN device 101 compares the Master Rank of the NAN device 103 corresponding to the transmission source of the Data Link Beacon with its own Master Rank (S802). At this time, the NAN device 103 of the transmission source of the Data Link Beacon is higher than the Master Rank of the NAN device 101 (S802: No). In this case, it is determined that the NAN device 101 does not transmit the Data Link Beacon in the next Basic DLW of the Service ID=10 (S803). It should be noted however that, since No is determined in S801 with regard to the Service ID=20, as illustrated in S805, it is determined that the NAN device 101 transmits the Data Link Beacon. On the other hand, after the determinations of Yes in S801, No in S802, and No in S804, it is determined that the NAN device 103 transmits the Data Link Beacon with regard to the Service ID=10 (S805).

Descriptions will be given with reference to FIG. 10 again. When the time reaches the next DW period (DW3), the NAN device 105 operating as the Master transmits the Sync Beacon (S1013). Next, as a result of the above-described processing by the NAN devices 101 and 103 which is illustrated in FIG. 8, the Data Link Beacon transmitted by the NAN device 101 in S1014 includes only the Basic DLW of the Service ID=20. On the other hand, the Data Link Beacon transmitted by the NAN device 103 in S1015 includes only the Basic DLW of the Service ID=10. With this configuration, only the NAN device having the highest Master Rank among the NAN devices that have established the data links in these Service IDs can transmit the Data Link Beacon of the Service ID. Therefore, it is possible to avoid the situation where the Data Link Beacons having the same contents are transmitted in a duplicated manner, and the occupancy of the wireless band can be avoided.

FIG. 11 is a sequence diagram representing a series of processing of cancelling the establishment of the data link after the establishment of the data link based on the NAN and the end of the application communication processing according to the present embodiment.

First, when the time reaches the DW period, the Sync Beacon and the Data Link Beacon are respectively transmitted (S1101, S1102, and S1103). These processings are the same as the processings in S1013, S1014, and S1015 of FIG. 10, and the descriptions thereof will be omitted.

When the user (not illustrated) of the NAN device 103 ends the chat application via the operation with respect to the input unit 304 (FIG. 3), the NAN device 103 transmits "service data link teardown" (S1104). As a result of the transmission of the service data link teardown, the NAN device 104 is notified that the data link communication based on the chat application is torn down, and the establishment of the data link is cancelled. It should be noted that a trigger for the NAN device 103 to transmit the service data link teardown is not limited to the user operation. For example, in a case where the communication based on the application does not exist for a certain period of time, the NAN device 103 may transmit the service data link teardown for tearing down the data link.

The service data link teardown is indicated by the SDF 500 of FIG. 5. In the case of the service data link teardown, the Type of DLSA 503 is defined as 3 (=the service data link teardown) according to the present embodiment. The Service ID of the service data link teardown in S1104 is 10 indicating the chat application.

When the NAN device 103 cancels the establishment of the data link based on the NAN for the application, next, the NAN device 103 transmits "data link schedule teardown" to cancel the scheduling of the data link established in S1008 (S1105). A format of the data link schedule teardown according to the present embodiment is indicated by the SDF 600 of FIG. 6. With regard to the data link schedule teardown, the Type of the DLWA 602 is represented by a value 4. At this time, the Basic DLW Bitmap, the Additional DLW Bitmap, and the Flexible DLW Bitmap of the DLWA may be omitted.

When the service data link teardown and the data link schedule teardown are transmitted, thereafter, the data link based on the NAN between the NAN device 103 and the NAN device 104 is invalidated. Therefore, the NAN device 103 and the NAN device 104 do not mutually perform the communication based on the chat application.

When the time reaches the next DW period (DW2), since the data link is not established, the processing of FIG. 8 is not executed, and the NAN device 103 and the NAN device 104 do not transmit the Data Link Beacon. On the other hand, the NAN device 101 still establishes the data links in the Service IDs=10 and 20 and also receives the Data Link Beacon from the NAN device 103 having the higher Master Rank than that of the NAN device 101 itself in S1103 during the DW period (DW1). For this reason, the NAN device 101 transmits only the Data Link Beacon of the Service ID=20 during the DW period (DW2) (S1107). The NAN device 101 does not receive the Data Link Beacon of the Service ID=10 during the DW period (DW2). For this reason, No is determined in S801, and No is determined in S804 in the flow chart of FIG. 8. The NAN device 101 transmits both the Data Link Beacons of the Service IDs=10 and 20 during the next DW period (DW3) (S1109).

Next, after S1109, the user of the NAN device 101 ends the file sharing application via the operation with respect to the input unit 304 (FIG. 3) and cancels the establishment of the data link of the Service ID=20. In this case, similarly as in S1104 and S1105, the NAN device 101 transmits the service data link teardown and the data link schedule teardown (S1110 and S1111). Therefore, during the next DW period (DW4), since the data link of the Service ID=20 is not established, the NAN device 101 transmits only the Data Link Beacon of the Service ID=10 (S1113).

Next, after S1113, the user of the NAN device 101 ends the chat application via the operation with respect to the input unit 304 (FIG. 3) and cancels the establishment of the data link of the Service ID=10. In this case, similarly as in S1110 and S1111, the NAN device 101 transmits the service data link teardown and the data link schedule teardown (S1114 and S1115). Therefore, the NAN device 101 does not transmit the Data Link Beacon during the next DW period (DW5).

In this manner, according to the present embodiment, after the data link is established, the NAN device that has established the data link announces the communication period of the data link (Basic DLW) and an identifier of the application (Service ID). With this configuration, the surrounding NAN device can determine the period of the data link communication established by itself in accordance with the data link communication period. As a result, the other NAN device can establish the data link while avoiding the period in which the data link communication is performed, and a communication throughput may be improved.

In addition, according to the present embodiment, there is also a possibility that the NAN device can reduce the power consumption where the data link communication period is shared with the other NAN device. For example, in S1007 and S1008 of FIG. 10, the NAN devices 101 102, 103, and 104 perform the communication during the same communication period. At this time, furthermore, the data link for the NAN device 102 and the NAN device 103 to execute the chat application can be established by the already established Basic DLW. Herein, in a case where the NAN device 102 and the NAN device 103 establish the data link in the Basic DLW different from the already established data link, the period in which the wireless transmission and reception can be performed needs to be extended, and there is a possibility that the power consumption is increased. However, when the data link is established in the Basic DLW as illustrated in S1006 or the same Basic DLW as the announced Basic DLW, the necessity for further establishing the Basic DLW by a different data link may be avoided. With this configuration, the power consumption may be reduced.

In addition, while the data link communication period is set to avoid the DW period corresponding to the period in which the service is discovered or searched for, it is possible to avoid the situation where it takes much time to discover the service because of the occupancy of the wireless band by the data link communication.

Second Embodiment

According to the present embodiment, the NAN device requests the NAN device operating as the Master to announce the Basic DLW in the NAN network after the data link is established. The requested NAN device includes the information of the Service ID and the Basic DLW of the established data link in the Sync Beacon for announcing the DW period to announce the period in which the data link communication is performed to the other NAN device. Hereafter, different aspects from the first embodiment will be described.

FIG. 12 is a sequence diagram representing processing when the data link is established, and the Master in the NAN network is requested to announce the Basic DLW.

The processings in S1201 to S1204 are the same as the processings in S401 to S404 of FIG. 4, and the descriptions thereof will be omitted. When the NAN device 101 establishes the data link (S1205), a frame called Data Link Notify including the information of the communication period and the Service ID based on the data link is transmitted to the NAN device 105 operating as the Master (S1206). Any frame may be used as the Data Link Notify as long as the information of the communication period and the Service ID based on the already established data link and the information of the transmission source are included. However, the Data Link Notify preferably includes the information of the Data Link List Attribute 702 (FIG. 7) in a format of Action Frame defined by a format of IEEE802.11. In addition, the Data Link Notify is transmitted by the NAN device 101 corresponding to the NAN device having the high Master Rank when the data link is established, and the Data Link Notify is not transmitted by the NAN device 102 having the lower Master Rank than that of the NAN device 101. It should be noted that, upon the descriptions with reference to FIG. 12, the Data Link Notify transmitted in S1206 and S1209 includes the Data Link List Attribute 702.

When the NAN device 105 operating as the Master receives the Data Link Notify, the NAN device 105 transmits the Sync Beacon during the next DW period (DW2) (S1207). At this time, the NAN device 105 assigns the Data Link List Attribute received in S1206 to the Sync Beacon to be transmitted. With this configuration, the other NAN device can identify the data link communication period and the Service ID of the data link established in S1205.

At this time, a case will be considered where the Master Rank of the NAN device 106 is changed, and the NAN device 106 operates as the Master in the NAN cluster 107. The NAN device 105 that has operated so far as the Master thereafter operates as the Non-Master Non-Sync.

When the DW period (DW3) is started, the NAN device 106 instead of the NAN device 105 transmits the Sync Beacon (S1208). At this time, the Data Link List Attribute is not assigned to the Sync Beacon. When the NAN device 101 receives the Sync Beacon from the NAN device 106, the NAN device 101 recognizes that the NAN device operating as the Master is changed from the NAN device 105 to the NAN device 106. Then, the NAN device 101 transmits the Data Link Notify having the same contents as S1206 to the NAN device 106 (S1209).

When the NAN device 106 receives the Data Link Notify, the NAN device 106 transmits the Sync Beacon during the next DW period (DW4) (S1210). At this time, the NAN device 106 assigns the Data Link List Attribute received in S1209 to be transmitted. With this configuration, the other NAN device can identify the data link communication period and the Service ID of the data link established in S1205.

Next, descriptions will be given of a case where the user of the NAN device 101 ends the chat application via the operation with respect to the input unit 304 (FIG. 3) and cancels the establishment of the data link. At this time, the NAN device 101 transmits Data Link Cancel before the data link is cancelled (S1211). The Data Link Cancel is a message for notifying the Master that the establishment of the data link is cancelled as being opposite to the Data Link Notify. The NAN device 101 may assign the information similar to the Data Link List Attribute transmitted in S1209 to the Data Link Cancel to notify the Master of which data link communication period and Service ID are to be torn down. After the NAN device 101 notifies the NAN device operating as the Master 106 of the Data Link Cancel, the NAN device 101 and the NAN device 102 perform the negotiation to cancel the communication based on the data link (S1212). With this configuration, the data link between the NAN device 101 and the NAN device 102 is cancelled.

When the NAN device 106 receives the Data Link Cancel, the NAN device 106 transmits the Sync Beacon to which the information of the Data Link List Attribute is not assigned during the next DW period (DW5) (S1213).

In this manner, according to the present embodiment, while the data link communication period and the Service ID are included in the Sync Beacon corresponding to the frame for the notification of the DW period, it is possible to decrease the number of frames during the DW period as compared with the number of frames according to the first embodiment. With this configuration, the occupancy time of the wireless communication band is shortened, and the NAN device can smoothly perform the service discovery and announcement during the DW period.

According to the present embodiment, the NAN devices 105 and 106 operating as the Master instead of the NAN device 101 that does not operate as the Master announce the data link communication period. In a case where the NAN device operating as the Master establishes the data link, the transmission of the Data Link Notify in S1206 may be omitted, and the Data Link List Attribute may be assigned to the Sync Beacon by itself.

Modified Examples

According to the second embodiment, the NAN device 101 that does not operate as the Master transmits the Data Link Notify to the NAN devices 105 and 106 operating as the Master such that the information of the Basic DLW is included in the Sync Beacon transmitted during the next DW period (S1206 and S1209). Instead of this configuration, the NAN device operating as the Master may announce the Basic DLW and the Service ID by the Sync Beacon. It should be noted that the Sync Beacon can be transmitted by not only the NAN device operating as the Master but also the NAN device operating as the Non-Master Sync.

For example, after the NAN device establishes the data link, in a case where the other NAN device that announces the Basic DLW and the Service ID of the data link by the Sync Beacon does not exist, the Master Preference of the NAN device may be increased. With this configuration, the NAN device 101 can operate as the Master or the Non-Master Sync in the NAN cluster 107 and transmit the Sync Beacon including the Basic DLW and the Service ID similarly as in the second embodiment. In this case, when the establishment of the data link is cancelled, the NAN device 101 may stop operating as the Master or the Non-Master Sync by decreasing the Master Preference and operate as the Non-Master Non-Sync.

In addition, according to the above-described embodiment, the data link communication based on the NAN has been described as 6 ch, but the other channel such as the other 2.4 GHz band channel or a 5 GHz band channel may be used. In this case, since the wireless bands do not collide with each other even in the case of the same Basic DLW if the channels are different from each other, the NAN device may determine in S902 that the period that is not overlapped regularly. In this case, in contrast, in S907 and S908, the same channel is preferably set for the Basic DLW.

In addition, according to the above-described embodiment, the NAN device operating as the Subscriber transmits the data link schedule request, but the NAN device operating as the Publisher may transmit the data link schedule request. The NAN device operating as the Publisher may perform the processing of FIG. 4. In addition, the NAN device operating as the Publisher may transmit Data link schedule response.

In S1107 of FIG. 11, the NAN device 101 transmits only the Data Link Beacon of the Service ID=10 during the DW period (DW2). In this case, the Basic DLW of the Service ID=20 is not announced during the DW period. For this reason, the NAN device that has not received the Data Link Beacon in which the Service ID and the Basic DLW are matched for a certain period of time during the DW period may transmit the Data Link Beacon.

In FIG. 4, the data link is established by the two stages of the negotiations to determine the service where the communication based on the application is desired to be started and the schedule in which the communication based on the application is performed (S405 to S409). This may be negotiated by using one type of message. That is, when the DLSA is included in the data link schedule request/response, the service where the communication based on the application is desired to be started may be indicated. In this case, the necessary information can be exchanged by the exchange of the data link schedule request/response alone, and the exchange of the service data link request/response becomes unnecessary. With this configuration, it is possible to reduce the radio wave band generated at the time of the establishment of the data link. Moreover, the data link can be promptly established by decreasing the number of messages.

In addition, according to the above-described embodiment, the NAN device 101 requests the period in which the communication based on the data link is performed by the data link schedule request corresponding to the request message for establishing the data link. However, the NAN device 101 may perform the notification of the period in which the communication based on the data link is desired to be performed by a message other than the data link schedule request. For example, the NAN device 101 may previously perform the notification before the data link establishment request is performed by the Subscribe message or the Publish message. While the notification is performed by the Subscribe message or the Publish message, the NAN devices that establish the data link can mutually identify the period in which the communication based on the data link is desired to be performed before the establishment of the data link is requested. With this configuration, for example, the NAN device 101 can establish the data link with the NAN device that can perform the data link communication during the communication period based on the data link convenient for itself among the NAN devices that provide the same service. As a result, the NAN device 101 can avoid the situation where the communication can be only performed during the communication period inconvenient for itself after the establishment of the data link is started.

In addition, according to the above-described embodiment, the descriptions have been given while the applications operating in the respective NAN devices are the chat application and the file sharing application. However, the present embodiment can also be applied to the other applications. For example, the other applications include a photo sharing application, a printing application, and the like.

In addition, according to the above-described embodiment, the Subscriber executes the process from the transmission of the Subscribe message to the discovery of the service, but the NAN device operating as the Publisher may actively search for the NAN device that needs the service. That is, the data link based on the NAN may be established in a case where the NAN device operating as the Publisher transmits the Publish message and the Subscribe message can be received as the response. The NAN device on one of the Publisher side and the Subscriber side may establish the data link based on the NAN.

In addition, according to the above-described embodiment, the NAN device 101 that requests the establishment of the data link executes the processing of determining the Basic DLW (FIG. 7 and FIG. 8). However, the NAN device requested to perform the establishment of the data link may also determine a value when a reply to the Basic DLW is made. That is, the NAN device requested to perform the establishment of the data link also realizes the establishment of the new data link on the basis of the Basic DLW where the data link has been already established, it is possible to realize the reduction in the power consumption the NAN cluster as a whole.

In addition, according to the above-described embodiment, one of the NAN devices executes the processing of announcing the Basic DLW without fail in a case where the data link is established. However, there may be cases where the Basic DLW is not announced. For example, to perform the large-volume data communication, in a case where the other NAN device is not desired to perform the communication in the DLW in the Basic DLW expected to be used by the NAN device, the control may be performed such that the Basic DLW is not announced. That is, in a case where the Basic DLW is desired to be shared with the other NAN device, the Data Link Beacon is transmitted. In a case where the Basic DLW is not desired to be shared with the other NAN device, the Data Link Beacon is not transmitted. With this configuration, the transmission frequency of the Data Link Beacon is decreased during the DW period, and it is possible to alleviate the congestion of the wireless band during the DW period.

In addition, according to the above-described embodiment, the NAN device attempts to establish the data link in the Basic DLW determined in accordance with the flow chart of FIG. 9. Herein, in a case where the request of the establishment of the data link in the determined Basic DLW is rejected, the NAN device may attempt the establishment of the data link in the other Basic DLW. For example, as a result of the flow chart of FIG. 9, the NAN device transmits the data link schedule request along with the Basic DLW determined in S907. In a case where the partner NAN device rejects the request, retry may be performed along with the Basic DLW determined in S908.

In addition, according to the above-described embodiment, the NAN device that requests the establishment of the data link determines the Basic DLW in the flow chart of FIG. 9. However, the NAN device where the establishment of the data link is requested may determine the Basic DLW replied in the data link schedule response in accordance with the flow chart of FIG. 9. As a result, in a case where the mutual Basic DLWs are not matched with each other in the data link schedule request/response, both the NAN devices may prioritize the Basic DLW of the NAN device having the high Master Rank. The probability that the Basic DLW of the NAN device having the high Master Rank stably exists in the network is high. For this reason, the Basic DLW of the NAN device having the low Master Rank is matched with the Basic DLW of the NAN device having the high Master Rank, so that it is possible to increase the probability that the establishment of the data link can be performed in the Basic DLW common to the other NAN device. As a result, it is possible to shorten the period in which the wireless control for the data link communication is turned on, and the power consumption can be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-143734, filed Jul. 21, 2016, which is hereby incorporated by reference herein in its entirety.

The invention claimed is:

1. A communication apparatus comprising:
one or more memories having instructions stored therein; and
one or more processors that, upon execution of the instructions, is configured to:
perform a first communication for establishing a data link during a first cyclic period, wherein the first cyclic period is a period in which devices in a network to which the communication apparatus belongs communicate a synchronization signal to synchronize each other;
set a second period, different from the first cyclic period, for performing a second communication with a partner apparatus in the network using the established data link; and
perform, during the second period the second communication with the partner apparatus using the established data link,
wherein, in a case where another data link has already been established in the network, the communication apparatus determines whether or not to set the second period such that the second communication is performed in the same period as a period that is set for the another data link, and sets the second period based on a result of the determination.

2. The communication apparatus according to claim 1, wherein the network is a network based on Neighbor Awareness Networking (NAN).

3. The communication apparatus according to claim 1, wherein the communication apparatus sets the second period in accordance with a data communication amount in the data link established via the first communication.

4. The communication apparatus according to claim 1, wherein the first cyclic period is a Discovery Window compliant with Neighbor Awareness Networking.

5. The communication apparatus according to claim 1, wherein the communication apparatus announces the second period during the first cyclic period.

6. The communication apparatus according to claim 5, wherein, in a case where the communication apparatus is an apparatus configured to determine and announce the first cyclic period, the communication apparatus announces the second period during the first cyclic period along with the synchronization signal for announcing the first cyclic period.

7. A communication method performed by a communication apparatus that includes one or more processors that are configured to perform the method comprising:
performing a first communication for establishing a data link during a first cyclic period, wherein the first cyclic period is a period in which devices in a network to which the communication apparatus belongs communicate a synchronization signal to synchronize each other;
setting a second period, different from the first cyclic period, for performing a second communication with a partner apparatus in the network using the established data link; and
performing, during the second period, the second communication with the partner apparatus using the established data link,
wherein, in a case where another data link has already been established in the network, it is determined whether or not to set the second period such that the second communication is performed in the same period as a period that is set for the another data link, and the second period is set based on a result of the determination.

8. A non-transitory computer-readable storage medium storing computer executable instructions, which when executed by one or more processors, cause a communication apparatus to perform a method comprising:
performing a first communication for establishing a data link during a first cyclic period, wherein the first cyclic period is a period in which devices in a network to which the communication apparatus belongs communicate a synchronization signal to synchronize each other;
setting a second period, different from the first cyclic period, for performing a second communication with a partner apparatus in the network using the established data link; and
performing, during the second period, the second communication with the partner apparatus using the established data link, wherein, in a case where another data link has already been established in the network, it is determined whether or not to set the second period such that the second communication is performed in the same period as a period that is set for the another data link, and the second period is set based on a result of the determination.

\* \* \* \* \*